(12) United States Patent
Zade et al.

(10) Patent No.: US 12,496,398 B2
(45) Date of Patent: Dec. 16, 2025

(54) THRESHOLD BASED AUTOMATIC GLUCOSE CONTROL RESPONSE

(71) Applicant: Insulet Corporation, Acton, MA (US)

(72) Inventors: Ashutosh Zade, San Diego, CA (US); Joon Bok Lee, Acton, MA (US); Yibin Zheng, Hartland, WI (US)

(73) Assignee: INSULET CORPORATION, Acton, MA (US)

( * ) Notice: Subject to any disclaimer, the term of this patent is extended or adjusted under 35 U.S.C. 154(b) by 849 days.

(21) Appl. No.: 17/824,494

(22) Filed: May 25, 2022

(65) Prior Publication Data

US 2022/0379029 A1 Dec. 1, 2022

Related U.S. Application Data

(60) Provisional application No. 63/194,381, filed on May 28, 2021.

(51) Int. Cl.

| | |
|---|---|
| *A61M 5/172* | (2006.01) |
| *A61B 5/00* | (2006.01) |
| *A61B 5/145* | (2006.01) |
| *A61M 5/142* | (2006.01) |

(Continued)

(52) U.S. Cl.
CPC ....... *A61M 5/1723* (2013.01); *A61B 5/14532* (2013.01); *A61B 5/4839* (2013.01); *A61M 5/14248* (2013.01); *G16H 20/17* (2018.01); *G16H 40/63* (2018.01);

(Continued)

(58) Field of Classification Search
None
See application file for complete search history.

(56) References Cited

U.S. PATENT DOCUMENTS

| | | | |
|---|---|---|---|
| 303,013 | A | 8/1884 | Horton |
| 441,663 | A | 12/1890 | Hofbauer |
| 955,911 | A | 4/1910 | Saegmuller |

(Continued)

FOREIGN PATENT DOCUMENTS

| | | |
|---|---|---|
| AU | 2015200834 A1 | 3/2015 |
| AU | 2015301146 A1 | 3/2017 |

(Continued)

OTHER PUBLICATIONS

US 5,954,699 A, 09/1999, Jost et al. (withdrawn)

(Continued)

*Primary Examiner* — Manuel A Mendez
(74) *Attorney, Agent, or Firm* — GOODWIN PROCTER LLP

(57) ABSTRACT

Provided is a wearable medical device that includes a processor or logic circuitry. The wearable medical device may include a memory storing instructions that, when executed by the processor or logic circuitry, configure the wearable medical device to determine, by the processor or the logic circuitry, that an event affecting a blood glucose measurement value trend of a user has occurred. Based on the occurrence of the event, the processor or the logic circuitry may select a mode of operation of the analyte sensor, and generate a signal indicating the selected mode of operation. The mode of operation may correspond to a sampling frequency of a physical attribute or physiological condition of a user of the wearable medical device.

20 Claims, 8 Drawing Sheets

(51) Int. Cl.
  *G16H 20/17* (2018.01)
  *G16H 40/63* (2018.01)
(52) U.S. Cl.
  CPC ............ *A61M 2005/14208* (2013.01); *A61M 2205/52* (2013.01); *A61M 2230/201* (2013.01)

(56) References Cited

U.S. PATENT DOCUMENTS

| | | |
|---|---|---|
| 1,441,508 A | 1/1923 | Marius |
| 2,797,149 A | 6/1957 | Skeggs |
| 2,897,214 A | 7/1959 | Chamberlin |
| 3,579,805 A | 5/1971 | Kast |
| 3,631,847 A | 1/1972 | Hobbs |
| 3,634,039 A | 1/1972 | Brondy |
| 3,812,843 A | 5/1974 | Wootten et al. |
| 3,841,328 A | 10/1974 | Jensen |
| 3,963,380 A | 6/1976 | Thomas, Jr. et al. |
| 4,055,175 A | 10/1977 | Clemens et al. |
| 4,146,029 A | 3/1979 | Ellinwood, Jr. |
| 4,151,845 A | 5/1979 | Clemens |
| 4,206,401 A | 6/1980 | Meyer |
| 4,245,634 A | 1/1981 | Albisser et al. |
| 4,277,226 A | 7/1981 | Archibald |
| 4,307,713 A | 12/1981 | Galkin et al. |
| 4,368,980 A | 1/1983 | Aldred et al. |
| 4,373,527 A | 2/1983 | Fischell |
| 4,398,542 A | 8/1983 | Cunningham et al. |
| 4,403,984 A | 9/1983 | Ash et al. |
| 4,464,170 A | 8/1984 | Clemens et al. |
| 4,469,481 A | 9/1984 | Kobayashi |
| 4,475,901 A | 10/1984 | Kraegen et al. |
| 4,526,568 A | 7/1985 | Clemens et al. |
| 4,526,569 A | 7/1985 | Bernardi |
| 4,529,401 A | 7/1985 | Leslie et al. |
| 4,559,033 A | 12/1985 | Stephen et al. |
| 4,559,037 A | 12/1985 | Franetzki et al. |
| 4,560,979 A | 12/1985 | Rosskopf |
| 4,573,968 A | 3/1986 | Parker |
| 4,587,850 A | 5/1986 | Moser |
| 4,624,661 A | 11/1986 | Arimond |
| 4,633,878 A | 1/1987 | Bombardieri |
| 4,657,529 A | 4/1987 | Prince et al. |
| 4,685,903 A | 8/1987 | Cable et al. |
| 4,731,726 A | 3/1988 | Allen, III |
| 4,743,243 A | 5/1988 | Vaillancourt |
| 4,755,173 A | 7/1988 | Konopka et al. |
| 4,781,688 A | 11/1988 | Thoma et al. |
| 4,781,693 A | 11/1988 | Martinez et al. |
| 4,801,957 A | 1/1989 | Vandemoere |
| 4,808,161 A | 2/1989 | Kamen |
| 4,833,088 A | 5/1989 | Desimone et al. |
| 4,836,752 A | 6/1989 | Burkett |
| 4,850,954 A | 7/1989 | Charvin |
| 4,854,170 A | 8/1989 | Brimhall et al. |
| 4,882,600 A | 11/1989 | Van de Moere |
| 4,886,499 A | 12/1989 | Cirelli et al. |
| 4,900,292 A | 2/1990 | Berry et al. |
| 4,919,596 A | 4/1990 | Slate et al. |
| 4,925,444 A | 5/1990 | Orkin et al. |
| 4,940,527 A | 7/1990 | Kazlauskas et al. |
| 4,961,055 A | 10/1990 | Habib et al. |
| 4,973,998 A | 11/1990 | Gates |
| 4,975,581 A | 12/1990 | Robinson et al. |
| 4,976,720 A | 12/1990 | Machold et al. |
| 4,981,140 A | 1/1991 | Wyatt |
| 4,994,047 A | 2/1991 | Walker et al. |
| 5,007,286 A | 4/1991 | Malcolm et al. |
| 5,045,871 A | 9/1991 | Reinholdson |
| 5,097,834 A | 3/1992 | Skrabal |
| 5,102,406 A | 4/1992 | Arnold |
| 5,109,850 A | 5/1992 | Blanco et al. |
| 5,125,415 A | 6/1992 | Bell |
| 5,134,079 A | 7/1992 | Cusack et al. |
| 5,153,827 A | 10/1992 | Coutre et al. |
| 5,165,406 A | 11/1992 | Wong |
| 5,176,662 A | 1/1993 | Bartholomew et al. |
| 5,178,609 A | 1/1993 | Ishikawa |
| 5,207,642 A | 5/1993 | Orkin et al. |
| 5,232,439 A | 8/1993 | Campbell et al. |
| 5,232,668 A | 8/1993 | Grant et al. |
| 5,237,993 A | 8/1993 | Skrabal |
| 5,239,326 A | 8/1993 | Takai |
| 5,244,459 A | 9/1993 | Hill |
| 5,244,463 A | 9/1993 | Cordner, Jr. et al. |
| 5,257,980 A | 11/1993 | Van Antwerp et al. |
| 5,273,517 A | 12/1993 | Barone et al. |
| 5,281,808 A | 1/1994 | Kunkel |
| 5,299,571 A | 4/1994 | Mastrototaro |
| 5,308,982 A | 5/1994 | Ivaldi et al. |
| 5,342,298 A | 8/1994 | Michaels et al. |
| 5,377,674 A | 1/1995 | Kuestner |
| 5,380,665 A | 1/1995 | Cusack et al. |
| 5,385,539 A | 1/1995 | Maynard |
| 5,389,078 A | 2/1995 | Zalesky |
| 5,411,889 A | 5/1995 | Hoots et al. |
| 5,421,812 A | 6/1995 | Langley et al. |
| 5,452,033 A | 9/1995 | Balling et al. |
| 5,468,727 A | 11/1995 | Phillips et al. |
| 5,497,772 A * | 3/1996 | Schulman ............ A61B 5/1495 600/347 |
| 5,505,709 A | 4/1996 | Funderburk et al. |
| 5,505,828 A | 4/1996 | Wong et al. |
| 5,507,288 A | 4/1996 | Bocker et al. |
| 5,533,389 A | 7/1996 | Kamen et al. |
| 5,558,640 A | 9/1996 | Pfeiler et al. |
| 5,563,584 A | 10/1996 | Rader et al. |
| 5,569,186 A | 10/1996 | Lord et al. |
| 5,576,781 A | 11/1996 | Deleeuw |
| 5,584,813 A | 12/1996 | Livingston et al. |
| 5,585,733 A | 12/1996 | Paglione |
| 5,586,553 A | 12/1996 | Halili et al. |
| 5,609,572 A | 3/1997 | Lang |
| 5,647,853 A | 7/1997 | Feldmann et al. |
| 5,660,163 A | 8/1997 | Schulman et al. |
| 5,665,065 A | 9/1997 | Colman et al. |
| 5,678,539 A | 10/1997 | Schubert et al. |
| 5,685,844 A | 11/1997 | Marttila |
| 5,685,859 A | 11/1997 | Kornerup |
| 5,693,018 A | 12/1997 | Kriesel et al. |
| 5,697,899 A | 12/1997 | Hillman et al. |
| 5,700,695 A | 12/1997 | Yassinzadeh et al. |
| 5,703,364 A | 12/1997 | Rosenthal |
| 5,714,123 A | 2/1998 | Sohrab |
| 5,716,343 A | 2/1998 | Kriesel et al. |
| 5,722,397 A | 3/1998 | Eppstein |
| 5,726,404 A | 3/1998 | Brody |
| 5,726,751 A | 3/1998 | Altendorf et al. |
| 5,741,228 A | 4/1998 | Lambrecht et al. |
| 5,746,217 A | 5/1998 | Erickson et al. |
| 5,755,682 A | 5/1998 | Knudson et al. |
| 5,758,643 A | 6/1998 | Wong et al. |
| 5,785,681 A | 7/1998 | Indravudh et al. |
| 5,800,405 A | 9/1998 | McPhee |
| 5,800,420 A | 9/1998 | Gross et al. |
| 5,801,057 A | 9/1998 | Smart et al. |
| 5,804,048 A | 9/1998 | Wong et al. |
| 5,817,007 A | 10/1998 | Fodgaard et al. |
| 5,820,622 A | 10/1998 | Gross et al. |
| 5,823,951 A | 10/1998 | Messerschmidt |
| 5,830,999 A | 11/1998 | Dunn |
| 5,840,020 A | 11/1998 | Heinonen et al. |
| 5,848,991 A | 12/1998 | Gross et al. |
| 5,851,197 A | 12/1998 | Marano et al. |
| 5,858,005 A | 1/1999 | Kriesel |
| 5,865,806 A | 2/1999 | Howell |
| 5,867,688 A | 2/1999 | Simmon et al. |
| 5,871,470 A | 2/1999 | McWha |
| 5,879,310 A | 3/1999 | Sopp et al. |
| 5,899,882 A | 5/1999 | Waksman et al. |
| 5,902,253 A | 5/1999 | Pfeiffer et al. |
| 5,931,814 A | 8/1999 | Alex et al. |
| 5,932,175 A | 8/1999 | Knute et al. |
| 5,935,099 A | 8/1999 | Peterson et al. |
| 5,947,911 A | 9/1999 | Wong et al. |

(56) References Cited

U.S. PATENT DOCUMENTS

| | | |
|---|---|---|
| 5,971,941 A | 10/1999 | Simons et al. |
| 5,993,423 A | 11/1999 | Choi |
| 5,995,236 A | 11/1999 | Roth et al. |
| 5,997,501 A | 12/1999 | Gross et al. |
| 6,017,318 A | 1/2000 | Gauthier et al. |
| 6,024,539 A | 2/2000 | Blomquist |
| 6,032,059 A | 2/2000 | Henning et al. |
| 6,036,924 A | 3/2000 | Simons et al. |
| 6,040,578 A | 3/2000 | Malin et al. |
| 6,049,727 A | 4/2000 | Crothall |
| 6,050,978 A | 4/2000 | Orr et al. |
| 6,058,934 A | 5/2000 | Sullivan |
| 6,066,103 A | 5/2000 | Duchon et al. |
| 6,071,292 A | 6/2000 | Makower et al. |
| 6,072,180 A | 6/2000 | Kramer et al. |
| 6,077,055 A | 6/2000 | Vilks |
| 6,090,092 A | 7/2000 | Fowles et al. |
| 6,101,406 A | 8/2000 | Hacker et al. |
| 6,102,872 A | 8/2000 | Doneen et al. |
| 6,115,673 A | 9/2000 | Malin et al. |
| 6,123,827 A | 9/2000 | Wong et al. |
| 6,124,134 A | 9/2000 | Stark |
| 6,126,637 A | 10/2000 | Kriesel et al. |
| 6,128,519 A | 10/2000 | Say |
| 6,142,181 A | 11/2000 | Schumacher |
| 6,142,939 A | 11/2000 | Eppstein et al. |
| 6,143,164 A | 11/2000 | Heller et al. |
| 6,157,041 A | 12/2000 | Thomas et al. |
| 6,161,028 A | 12/2000 | Braig et al. |
| 6,162,639 A | 12/2000 | Douglas |
| 6,171,264 B1 | 1/2001 | Bader |
| 6,196,046 B1 | 3/2001 | Braig et al. |
| 6,200,287 B1 | 3/2001 | Keller et al. |
| 6,200,293 B1 | 3/2001 | Kriesel et al. |
| 6,200,338 B1 | 3/2001 | Solomon et al. |
| 6,214,629 B1 | 4/2001 | Freitag et al. |
| 6,226,082 B1 | 5/2001 | Roe |
| 6,244,776 B1 | 6/2001 | Wiley |
| 6,261,065 B1 | 7/2001 | Nayak et al. |
| 6,262,798 B1 | 7/2001 | Shepherd et al. |
| 6,270,455 B1 | 8/2001 | Brown |
| 6,271,045 B1 | 8/2001 | Douglas et al. |
| 6,280,381 B1 | 8/2001 | Malin et al. |
| 6,285,448 B1 | 9/2001 | Kuenstner |
| 6,309,370 B1 | 10/2001 | Haim et al. |
| 6,312,888 B1 | 11/2001 | Wong et al. |
| 6,334,851 B1 | 1/2002 | Hayes et al. |
| 6,375,627 B1 | 4/2002 | Mauze et al. |
| 6,379,301 B1 | 4/2002 | Worthington et al. |
| 6,381,029 B1 | 4/2002 | Tipirneni |
| 6,402,689 B1 | 6/2002 | Scarantino et al. |
| 6,418,332 B1 | 7/2002 | Mastrototaro et al. |
| 6,470,279 B1 | 10/2002 | Samsoondar |
| 6,475,196 B1 | 11/2002 | Vachon |
| 6,477,901 B1 | 11/2002 | Tadigadapa et al. |
| 6,484,044 B1 | 11/2002 | Lilienfeld-Toal |
| 6,491,656 B1 | 12/2002 | Morris |
| 6,512,937 B2 | 1/2003 | Blank et al. |
| 6,514,460 B1 | 2/2003 | Fendrock |
| 6,525,509 B1 | 2/2003 | Petersson et al. |
| 6,528,809 B1 | 3/2003 | Thomas et al. |
| 6,540,672 B1 | 4/2003 | Simonsen et al. |
| 6,544,212 B2 | 4/2003 | Galley et al. |
| 6,546,268 B1 | 4/2003 | Ishikawa et al. |
| 6,546,269 B1 | 4/2003 | Kurnik |
| 6,553,841 B1 | 4/2003 | Blouch |
| 6,554,798 B1 | 4/2003 | Mann et al. |
| 6,556,850 B1 | 4/2003 | Braig et al. |
| 6,558,351 B1 | 5/2003 | Steil et al. |
| 6,560,471 B1 | 5/2003 | Heller et al. |
| 6,561,978 B1 | 5/2003 | Conn et al. |
| 6,562,001 B2 | 5/2003 | Lebel et al. |
| 6,562,014 B2 | 5/2003 | Lin et al. |
| 6,569,125 B2 | 5/2003 | Jepson et al. |
| 6,572,542 B1 | 6/2003 | Houben et al. |
| 6,572,545 B2 | 6/2003 | Knobbe et al. |
| 6,574,490 B2 | 6/2003 | Abbink et al. |
| 6,575,905 B2 | 6/2003 | Knobbe et al. |
| 6,580,934 B1 | 6/2003 | Braig et al. |
| 6,618,603 B2 | 9/2003 | Varalli et al. |
| 6,633,772 B2 | 10/2003 | Ford et al. |
| 6,645,142 B2 | 11/2003 | Braig et al. |
| 6,653,091 B1 | 11/2003 | Dunn et al. |
| 6,662,030 B2 | 12/2003 | Khalil et al. |
| 6,669,663 B1 | 12/2003 | Thompson |
| 6,678,542 B2 | 1/2004 | Braig et al. |
| 6,685,452 B2 | 2/2004 | Christiansen et al. |
| 6,699,221 B2 | 3/2004 | Vaillancourt |
| 6,718,189 B2 | 4/2004 | Rohrscheib et al. |
| 6,721,582 B2 | 4/2004 | Trepagnier et al. |
| 6,728,560 B2 | 4/2004 | Kollias et al. |
| 6,740,059 B2 | 5/2004 | Flaherty |
| 6,740,072 B2 | 5/2004 | Starkweather et al. |
| 6,751,490 B2 | 6/2004 | Esenaliev et al. |
| 6,758,835 B2 | 7/2004 | Close et al. |
| 6,768,319 B2 | 7/2004 | Wang |
| 6,768,425 B2 | 7/2004 | Flaherty et al. |
| 6,780,156 B2 | 8/2004 | Haueter et al. |
| 6,810,290 B2 | 10/2004 | Lebel et al. |
| 6,830,558 B2 | 12/2004 | Flaherty et al. |
| 6,837,858 B2 | 1/2005 | Cunningham et al. |
| 6,837,988 B2 | 1/2005 | Eong et al. |
| 6,846,288 B2 | 1/2005 | Nagar et al. |
| 6,862,534 B2 | 3/2005 | Sterling et al. |
| 6,865,408 B1 | 3/2005 | Abbink et al. |
| 6,890,291 B2 | 5/2005 | Robinson et al. |
| 6,936,029 B2 | 8/2005 | Mann et al. |
| 6,949,081 B1 | 9/2005 | Chance |
| 6,958,809 B2 | 10/2005 | Sterling et al. |
| 6,989,891 B2 | 1/2006 | Braig et al. |
| 6,990,366 B2 | 1/2006 | Say et al. |
| 7,008,404 B2 | 3/2006 | Nakajima |
| 7,009,180 B2 | 3/2006 | Sterling et al. |
| 7,016,713 B2 | 3/2006 | Gardner et al. |
| 7,018,360 B2 | 3/2006 | Flaherty et al. |
| 7,025,743 B2 | 4/2006 | Mann et al. |
| 7,025,744 B2 | 4/2006 | Utterberg et al. |
| 7,027,848 B2 | 4/2006 | Robinson et al. |
| 7,043,288 B2 | 5/2006 | Davis, III et al. |
| 7,060,059 B2 | 6/2006 | Keith et al. |
| 7,061,593 B2 | 6/2006 | Braig et al. |
| 7,096,124 B2 | 8/2006 | Sterling et al. |
| 7,115,205 B2 | 10/2006 | Robinson et al. |
| 7,128,727 B2 | 10/2006 | Flaherty et al. |
| 7,137,964 B2 | 11/2006 | Flaherty |
| 7,139,593 B2 | 11/2006 | Kavak et al. |
| 7,139,598 B2 | 11/2006 | Hull et al. |
| 7,144,384 B2 | 12/2006 | Gorman et al. |
| 7,171,252 B1 | 1/2007 | Scarantino et al. |
| 7,182,726 B2 | 2/2007 | Williams et al. |
| 7,190,988 B2 | 3/2007 | Say et al. |
| 7,204,823 B2 | 4/2007 | Estes et al. |
| 7,248,912 B2 | 7/2007 | Gough et al. |
| 7,267,665 B2 | 9/2007 | Steil et al. |
| 7,271,912 B2 | 9/2007 | Sterling et al. |
| 7,278,983 B2 | 10/2007 | Ireland et al. |
| 7,291,107 B2 | 11/2007 | Hellwig et al. |
| 7,291,497 B2 | 11/2007 | Holmes et al. |
| 7,303,073 B2 | 12/2007 | Raynal-Olive et al. |
| 7,303,549 B2 | 12/2007 | Flaherty et al. |
| 7,303,622 B2 | 12/2007 | Loch et al. |
| 7,303,922 B2 | 12/2007 | Jeng et al. |
| 7,354,420 B2 | 4/2008 | Steil et al. |
| 7,388,202 B2 | 6/2008 | Sterling et al. |
| 7,402,153 B2 | 7/2008 | Steil et al. |
| 7,404,796 B2 | 7/2008 | Ginsberg |
| 7,429,255 B2 | 9/2008 | Thompson |
| 7,460,130 B2 | 12/2008 | Salganicoff |
| 7,481,787 B2 | 1/2009 | Gable et al. |
| 7,491,187 B2 | 2/2009 | Van Den Berghe et al. |
| 7,500,949 B2 | 3/2009 | Gottlieb et al. |
| 7,509,156 B2 | 3/2009 | Flanders |
| 7,547,281 B2 | 6/2009 | Hayes et al. |
| 7,569,030 B2 | 8/2009 | Lebel et al. |

(56) References Cited

U.S. PATENT DOCUMENTS

| | | |
|---|---|---|
| 7,608,042 B2 | 10/2009 | Goldberger et al. |
| 7,651,845 B2 | 1/2010 | Doyle, III et al. |
| 7,680,529 B2 | 3/2010 | Kroll |
| 7,731,900 B2 | 6/2010 | Haar et al. |
| 7,734,323 B2 | 6/2010 | Blomquist et al. |
| 7,766,829 B2 | 8/2010 | Sloan et al. |
| 7,785,258 B2 | 8/2010 | Braig et al. |
| 7,806,854 B2 | 10/2010 | Damiano et al. |
| 7,806,886 B2 | 10/2010 | Kanderian, Jr. et al. |
| 7,842,241 B2 | 11/2010 | Arbogast et al. |
| 7,846,385 B2 | 12/2010 | Arbogast et al. |
| 7,846,386 B2 | 12/2010 | Arbogast et al. |
| 7,846,387 B2 | 12/2010 | Arbogast et al. |
| 7,846,388 B2 | 12/2010 | Arbogast et al. |
| 7,867,446 B2 | 1/2011 | Arbogast et al. |
| 7,897,107 B2 | 3/2011 | Arbogast et al. |
| 7,914,742 B2 | 3/2011 | Arbogast et al. |
| 7,918,825 B2 | 4/2011 | OConnor et al. |
| 7,946,985 B2 | 5/2011 | Mastrototaro et al. |
| 7,972,296 B2 | 7/2011 | Braig et al. |
| 8,003,052 B2 | 8/2011 | Sacherer |
| 8,056,719 B2 | 11/2011 | Porret et al. |
| 8,080,205 B2 | 12/2011 | Arbogast et al. |
| 8,105,282 B2 | 1/2012 | Susi et al. |
| 8,221,345 B2 | 7/2012 | Blomquist |
| 8,251,907 B2 | 8/2012 | Sterling et al. |
| 8,285,487 B2 | 10/2012 | Bergstrom et al. |
| 8,431,408 B2 | 4/2013 | Lewis et al. |
| 8,449,524 B2 | 5/2013 | Braig et al. |
| 8,452,359 B2 | 5/2013 | Rebec et al. |
| 8,454,557 B1 | 6/2013 | Qi et al. |
| 8,454,576 B2 | 6/2013 | Mastrototaro et al. |
| 8,461,561 B2 | 6/2013 | Freeman et al. |
| 8,465,977 B2 | 6/2013 | Joseph et al. |
| 8,467,980 B2 | 6/2013 | Campbell et al. |
| 8,478,557 B2 | 7/2013 | Hayter et al. |
| 8,547,239 B2 | 10/2013 | Peatfield et al. |
| 8,597,274 B2 | 12/2013 | Sloan et al. |
| 8,622,988 B2 | 1/2014 | Hayter |
| 8,701,264 B2 | 4/2014 | Martinson |
| 8,727,117 B2 | 5/2014 | Maasarani |
| 8,765,482 B2 | 7/2014 | Joseph et al. |
| 8,810,394 B2 | 8/2014 | Kalpin |
| 8,894,262 B2 | 11/2014 | Celentano et al. |
| 9,005,166 B2 | 4/2015 | Uber, III et al. |
| 9,061,097 B2 | 6/2015 | Holt et al. |
| 9,171,343 B1 | 10/2015 | Fischell et al. |
| 9,233,204 B2 | 1/2016 | Booth et al. |
| 9,248,229 B2 | 2/2016 | Devouassoux et al. |
| 9,265,877 B2 | 2/2016 | Mcarthur |
| 9,427,710 B2 | 8/2016 | Jansen |
| 9,486,571 B2 | 11/2016 | Rosinko |
| 9,572,926 B2 | 2/2017 | Cabiri |
| 9,579,456 B2 | 2/2017 | Budiman et al. |
| 9,598,195 B2 | 3/2017 | Deutschle et al. |
| 9,743,224 B2 | 8/2017 | San Vicente et al. |
| 9,814,832 B2 | 11/2017 | Agard et al. |
| 9,862,519 B2 | 1/2018 | Deutschle et al. |
| 9,907,515 B2 | 3/2018 | Doyle, III et al. |
| 9,980,140 B1 | 5/2018 | Spencer et al. |
| 9,984,773 B2 | 5/2018 | Gondhalekar et al. |
| 10,046,114 B1 | 8/2018 | Biederman et al. |
| RE47,100 E | 10/2018 | Smith et al. |
| 10,086,131 B2 | 10/2018 | Okihara |
| 10,248,839 B2 | 4/2019 | Levy et al. |
| 10,335,464 B1 | 7/2019 | Michelich et al. |
| 10,342,926 B2 | 7/2019 | Nazzaro et al. |
| 10,441,717 B2 | 10/2019 | Schmid et al. |
| 10,583,250 B2 | 3/2020 | Mazlish et al. |
| 10,661,012 B2 | 5/2020 | Nazzaro et al. |
| 10,737,024 B2 | 8/2020 | Schmid |
| 10,835,672 B2 * | 11/2020 | Dobbles .............. A61M 5/1723 |
| 10,987,468 B2 | 4/2021 | Mazlish |
| 11,090,434 B2 * | 8/2021 | O'Connor ......... A61M 5/14248 |
| 11,197,964 B2 | 12/2021 | Sjolund et al. |
| 11,260,169 B2 | 3/2022 | Estes |
| 2001/0021803 A1 | 9/2001 | Blank et al. |
| 2001/0034023 A1 | 10/2001 | Stanton, Jr. et al. |
| 2001/0034502 A1 | 10/2001 | Moberg et al. |
| 2001/0051377 A1 | 12/2001 | Hammer et al. |
| 2001/0053895 A1 | 12/2001 | Vaillancourt |
| 2002/0010401 A1 | 1/2002 | Bushmakin et al. |
| 2002/0010423 A1 | 1/2002 | Gross et al. |
| 2002/0016568 A1 | 2/2002 | Lebel et al. |
| 2002/0032374 A1 | 3/2002 | Holker et al. |
| 2002/0040208 A1 | 4/2002 | Flaherty et al. |
| 2002/0123740 A1 | 9/2002 | Flaherty et al. |
| 2002/0128543 A1 | 9/2002 | Leonhardt |
| 2002/0147423 A1 | 10/2002 | Burbank et al. |
| 2002/0155425 A1 | 10/2002 | Han et al. |
| 2002/0161288 A1 | 10/2002 | Shin et al. |
| 2002/0161307 A1 | 10/2002 | Yu et al. |
| 2003/0023148 A1 | 1/2003 | Lorenz et al. |
| 2003/0050621 A1 | 3/2003 | Lebel et al. |
| 2003/0060692 A1 | 3/2003 | Ruchti et al. |
| 2003/0073952 A1 | 4/2003 | Flaherty et al. |
| 2003/0086074 A1 | 5/2003 | Braig et al. |
| 2003/0086075 A1 | 5/2003 | Braig et al. |
| 2003/0090649 A1 | 5/2003 | Sterling et al. |
| 2003/0100040 A1 | 5/2003 | Bonnecaze et al. |
| 2003/0130616 A1 | 7/2003 | Steil et al. |
| 2003/0135388 A1 | 7/2003 | Martucci et al. |
| 2003/0144582 A1 | 7/2003 | Cohen et al. |
| 2003/0163097 A1 | 8/2003 | Fleury et al. |
| 2003/0195404 A1 | 10/2003 | Knobbe et al. |
| 2003/0208113 A1 | 11/2003 | Mault et al. |
| 2003/0208154 A1 | 11/2003 | Close et al. |
| 2003/0212379 A1 | 11/2003 | Bylund et al. |
| 2003/0216627 A1 | 11/2003 | Lorenz et al. |
| 2003/0220605 A1 | 11/2003 | Bowman, Jr. et al. |
| 2004/0010207 A1 | 1/2004 | Flaherty et al. |
| 2004/0010507 A1 | 1/2004 | Bellew |
| 2004/0034295 A1 | 2/2004 | Salganicoff |
| 2004/0045879 A1 | 3/2004 | Shults et al. |
| 2004/0051368 A1 | 3/2004 | Caputo et al. |
| 2004/0064259 A1 | 4/2004 | Haaland et al. |
| 2004/0085215 A1 | 5/2004 | Moberg et al. |
| 2004/0097796 A1 | 5/2004 | Berman et al. |
| 2004/0116847 A1 | 6/2004 | Wall |
| 2004/0122353 A1 | 6/2004 | Shahmirian et al. |
| 2004/0133166 A1 | 7/2004 | Moberg et al. |
| 2004/0147034 A1 | 7/2004 | Gore et al. |
| 2004/0171983 A1 | 9/2004 | Sparks et al. |
| 2004/0186365 A1* | 9/2004 | Jin .................... A61B 5/14532<br>128/903 |
| 2004/0203357 A1 | 10/2004 | Nassimi |
| 2004/0204868 A1 | 10/2004 | Maynard et al. |
| 2004/0215492 A1 | 10/2004 | Choi |
| 2004/0220517 A1 | 11/2004 | Starkweather et al. |
| 2004/0241736 A1 | 12/2004 | Hendee et al. |
| 2004/0249308 A1 | 12/2004 | Forssell |
| 2005/0003470 A1 | 1/2005 | Nelson et al. |
| 2005/0009126 A1 | 1/2005 | Andrews et al. |
| 2005/0020980 A1 | 1/2005 | Inoue et al. |
| 2005/0022274 A1 | 1/2005 | Campbell et al. |
| 2005/0033148 A1 | 2/2005 | Haueter et al. |
| 2005/0049179 A1 | 3/2005 | Davidson et al. |
| 2005/0055242 A1 | 3/2005 | Bello et al. |
| 2005/0065464 A1 | 3/2005 | Talbot et al. |
| 2005/0065465 A1 | 3/2005 | Lebel et al. |
| 2005/0075624 A1 | 4/2005 | Miesel |
| 2005/0105095 A1 | 5/2005 | Pesach et al. |
| 2005/0125162 A1 | 6/2005 | Hajizadeh et al. |
| 2005/0137573 A1 | 6/2005 | McLaughlin |
| 2005/0171503 A1 | 8/2005 | Van Den Berghe et al. |
| 2005/0182306 A1 | 8/2005 | Sloan |
| 2005/0192494 A1 | 9/2005 | Ginsberg |
| 2005/0192557 A1 | 9/2005 | Brauker et al. |
| 2005/0197621 A1 | 9/2005 | Poulsen et al. |
| 2005/0201897 A1 | 9/2005 | Zimmer et al. |
| 2005/0203360 A1 | 9/2005 | Brauker et al. |
| 2005/0203461 A1 | 9/2005 | Flaherty et al. |
| 2005/0232815 A1 | 10/2005 | Ruhl et al. |
| 2005/0238507 A1 | 10/2005 | Dilanni et al. |

(56) References Cited

U.S. PATENT DOCUMENTS

| | | |
|---|---|---|
| 2005/0261660 A1 | 11/2005 | Choi |
| 2005/0272640 A1 | 12/2005 | Doyle, III et al. |
| 2005/0277164 A1 | 12/2005 | Drucker et al. |
| 2005/0277912 A1 | 12/2005 | John |
| 2006/0009727 A1 | 1/2006 | OMahony et al. |
| 2006/0079809 A1 | 4/2006 | Goldberger et al. |
| 2006/0086909 A1 | 4/2006 | Schaber |
| 2006/0092569 A1 | 5/2006 | Che et al. |
| 2006/0100494 A1 | 5/2006 | Kroll |
| 2006/0134323 A1 | 6/2006 | OBrien |
| 2006/0167350 A1 | 7/2006 | Monfre et al. |
| 2006/0173406 A1 | 8/2006 | Hayes et al. |
| 2006/0189925 A1 | 8/2006 | Gable et al. |
| 2006/0189926 A1 | 8/2006 | Hall et al. |
| 2006/0197015 A1 | 9/2006 | Sterling et al. |
| 2006/0200070 A1 | 9/2006 | Callicoat et al. |
| 2006/0204535 A1 | 9/2006 | Johnson |
| 2006/0229531 A1 | 10/2006 | Goldberger et al. |
| 2006/0253085 A1 | 11/2006 | Geismar et al. |
| 2006/0264895 A1 | 11/2006 | Flanders |
| 2006/0264926 A1 | 11/2006 | Kochamba |
| 2006/0270983 A1 | 11/2006 | Lord et al. |
| 2006/0276771 A1 | 12/2006 | Galley et al. |
| 2006/0282290 A1 | 12/2006 | Flaherty et al. |
| 2007/0016127 A1 | 1/2007 | Staib et al. |
| 2007/0027370 A1 | 2/2007 | Brauker et al. |
| 2007/0060796 A1 | 3/2007 | Kim |
| 2007/0060869 A1 | 3/2007 | Tolle et al. |
| 2007/0060872 A1 | 3/2007 | Hall et al. |
| 2007/0078784 A1 | 4/2007 | Donovan et al. |
| 2007/0083160 A1 | 4/2007 | Hall et al. |
| 2007/0106135 A1 | 5/2007 | Sloan et al. |
| 2007/0116601 A1 | 5/2007 | Patton |
| 2007/0118405 A1 | 5/2007 | Campbell et al. |
| 2007/0129690 A1 | 6/2007 | Rosenblatt et al. |
| 2007/0142720 A1 | 6/2007 | Ridder et al. |
| 2007/0173761 A1 | 7/2007 | Kanderian et al. |
| 2007/0173974 A1 | 7/2007 | Lin et al. |
| 2007/0179352 A1 | 8/2007 | Randlov et al. |
| 2007/0179885 A1 | 8/2007 | Bird et al. |
| 2007/0191716 A1 | 8/2007 | Goldberger et al. |
| 2007/0191770 A1 | 8/2007 | Moberg et al. |
| 2007/0197163 A1 | 8/2007 | Robertson |
| 2007/0225675 A1 | 9/2007 | Robinson et al. |
| 2007/0233051 A1 | 10/2007 | Hohl et al. |
| 2007/0244381 A1 | 10/2007 | Robinson et al. |
| 2007/0249007 A1 | 10/2007 | Rosero |
| 2007/0264707 A1 | 11/2007 | Liederman et al. |
| 2007/0282269 A1 | 12/2007 | Carter et al. |
| 2007/0287985 A1 | 12/2007 | Estes et al. |
| 2007/0293843 A1 | 12/2007 | Ireland et al. |
| 2008/0004515 A1 | 1/2008 | Jennewine |
| 2008/0027371 A1 | 1/2008 | Higuchi et al. |
| 2008/0033272 A1 | 2/2008 | Gough et al. |
| 2008/0051764 A1 | 2/2008 | Dent et al. |
| 2008/0058625 A1 | 3/2008 | McGarraugh et al. |
| 2008/0065050 A1 | 3/2008 | Sparks et al. |
| 2008/0071157 A1 | 3/2008 | McGarraugh et al. |
| 2008/0071158 A1 | 3/2008 | McGarraugh et al. |
| 2008/0077081 A1 | 3/2008 | Mounce et al. |
| 2008/0078400 A1 | 4/2008 | Martens et al. |
| 2008/0097289 A1 | 4/2008 | Steil et al. |
| 2008/0132880 A1 | 6/2008 | Buchman |
| 2008/0161664 A1 | 7/2008 | Mastrototaro et al. |
| 2008/0172026 A1 | 7/2008 | Blomquist |
| 2008/0173073 A1 | 7/2008 | Downie et al. |
| 2008/0177165 A1 | 7/2008 | Blomquist et al. |
| 2008/0188796 A1 | 8/2008 | Steil et al. |
| 2008/0200838 A1 | 8/2008 | Goldberger et al. |
| 2008/0206067 A1 | 8/2008 | De Corral et al. |
| 2008/0208113 A1 | 8/2008 | Damiano et al. |
| 2008/0214919 A1 | 9/2008 | Harmon et al. |
| 2008/0228056 A1 | 9/2008 | Blomquist et al. |
| 2008/0249386 A1 | 10/2008 | Besterman et al. |
| 2008/0255438 A1 | 10/2008 | Saidara et al. |
| 2008/0269585 A1 | 10/2008 | Ginsberg |
| 2008/0269714 A1 | 10/2008 | Mastrototaro et al. |
| 2008/0269723 A1 | 10/2008 | Mastrototaro et al. |
| 2008/0281290 A1 | 11/2008 | Yodfat et al. |
| 2008/0287906 A1 | 11/2008 | Burkholz et al. |
| 2009/0006061 A1 | 1/2009 | Thukral et al. |
| 2009/0018406 A1 | 1/2009 | Yodfat et al. |
| 2009/0030398 A1 | 1/2009 | Yodfat et al. |
| 2009/0036753 A1 | 2/2009 | King |
| 2009/0043240 A1 | 2/2009 | Robinson et al. |
| 2009/0048556 A1 | 2/2009 | Durand |
| 2009/0054753 A1 | 2/2009 | Robinson et al. |
| 2009/0062767 A1 | 3/2009 | Van Antwerp et al. |
| 2009/0069743 A1 | 3/2009 | Krishnamoorthy et al. |
| 2009/0069745 A1 | 3/2009 | Estes et al. |
| 2009/0069787 A1 | 3/2009 | Estes et al. |
| 2009/0099521 A1 | 4/2009 | Gravesen et al. |
| 2009/0105573 A1 | 4/2009 | Malecha |
| 2009/0112769 A1 | 4/2009 | Dicks et al. |
| 2009/0131861 A1 | 5/2009 | Braig et al. |
| 2009/0156922 A1 | 6/2009 | Goldberger et al. |
| 2009/0156924 A1 | 6/2009 | Shariati et al. |
| 2009/0163781 A1 | 6/2009 | Say et al. |
| 2009/0177142 A1 | 7/2009 | Blomquist et al. |
| 2009/0198350 A1 | 8/2009 | Thiele |
| 2009/0204078 A1 | 8/2009 | Mitchell et al. |
| 2009/0221890 A1 | 9/2009 | Saffer et al. |
| 2009/0228214 A1 | 9/2009 | Say et al. |
| 2009/0254041 A1 | 10/2009 | Krag et al. |
| 2009/0282947 A1 | 11/2009 | Powell |
| 2009/0318791 A1 | 12/2009 | Kaastrup |
| 2009/0326343 A1 | 12/2009 | Gable et al. |
| 2010/0057042 A1 | 3/2010 | Hayter |
| 2010/0076275 A1 | 3/2010 | Chu et al. |
| 2010/0094251 A1 | 4/2010 | Estes |
| 2010/0114026 A1 | 5/2010 | Karratt et al. |
| 2010/0121170 A1 | 5/2010 | Rule |
| 2010/0137784 A1 | 6/2010 | Cefai et al. |
| 2010/0145272 A1 | 6/2010 | Cefai et al. |
| 2010/0152658 A1 | 6/2010 | Hanson et al. |
| 2010/0168683 A1 | 7/2010 | Cabiri |
| 2010/0174228 A1 | 7/2010 | Buckingham et al. |
| 2010/0185175 A1 | 7/2010 | Kamen et al. |
| 2010/0211003 A1 | 8/2010 | Sundar et al. |
| 2010/0228110 A1 | 9/2010 | Tsoukalis |
| 2010/0262117 A1 | 10/2010 | Magni et al. |
| 2010/0262434 A1 | 10/2010 | Shaya |
| 2010/0286997 A1 | 11/2010 | Srinivasan |
| 2010/0295686 A1 | 11/2010 | Sloan et al. |
| 2010/0298765 A1 | 11/2010 | Budiman et al. |
| 2010/0317951 A1 | 12/2010 | Rutkowski et al. |
| 2011/0021584 A1 | 1/2011 | Berggren et al. |
| 2011/0028817 A1 | 2/2011 | Jin et al. |
| 2011/0054390 A1 | 3/2011 | Searle et al. |
| 2011/0054399 A1 | 3/2011 | Chong et al. |
| 2011/0066053 A1* | 3/2011 | Yazicioglu ............... A61B 5/30 324/76.38 |
| 2011/0071765 A1 | 3/2011 | Yodfat et al. |
| 2011/0124996 A1 | 5/2011 | Reinke et al. |
| 2011/0142688 A1 | 6/2011 | Chappel et al. |
| 2011/0144586 A1 | 6/2011 | Michaud et al. |
| 2011/0152658 A1 | 6/2011 | Peyser et al. |
| 2011/0160652 A1 | 6/2011 | Yodfat et al. |
| 2011/0178472 A1 | 7/2011 | Cabiri |
| 2011/0190694 A1 | 8/2011 | Lanier, Jr. et al. |
| 2011/0193704 A1 | 8/2011 | Harper et al. |
| 2011/0202005 A1 | 8/2011 | Yodfat et al. |
| 2011/0213306 A1 | 9/2011 | Hanson et al. |
| 2011/0218495 A1 | 9/2011 | Remde |
| 2011/0225024 A1 | 9/2011 | Seyer et al. |
| 2011/0230833 A1 | 9/2011 | Andman et al. |
| 2011/0246235 A1 | 10/2011 | Powell et al. |
| 2011/0251509 A1 | 10/2011 | Beyhan et al. |
| 2011/0289497 A1 | 11/2011 | Kiaie et al. |
| 2011/0313680 A1 | 12/2011 | Doyle et al. |
| 2011/0316562 A1 | 12/2011 | Cefai et al. |
| 2012/0003935 A1 | 1/2012 | Lydon et al. |
| 2012/0010594 A1 | 1/2012 | Holt et al. |
| 2012/0029941 A1 | 2/2012 | Malave et al. |

(56) References Cited

U.S. PATENT DOCUMENTS

| | | |
|---|---|---|
| 2012/0030393 A1 | 2/2012 | Ganesh et al. |
| 2012/0050046 A1 | 3/2012 | Satorius et al. |
| 2012/0053556 A1 | 3/2012 | Lee |
| 2012/0054841 A1 | 3/2012 | Schultz et al. |
| 2012/0078067 A1 | 3/2012 | Kovatchev et al. |
| 2012/0078161 A1 | 3/2012 | Masterson et al. |
| 2012/0078181 A1 | 3/2012 | Smith et al. |
| 2012/0095316 A1 | 4/2012 | Lewis et al. |
| 2012/0101451 A1 | 4/2012 | Boit et al. |
| 2012/0123234 A1 | 5/2012 | Atlas et al. |
| 2012/0136336 A1 | 5/2012 | Mastrototaro et al. |
| 2012/0153936 A1 | 6/2012 | Romani et al. |
| 2012/0182939 A1 | 7/2012 | Rajan et al. |
| 2012/0184909 A1 | 7/2012 | Gyrn |
| 2012/0190955 A1 | 7/2012 | Rao et al. |
| 2012/0201048 A1 | 8/2012 | Prais |
| 2012/0203085 A1 | 8/2012 | Rebec |
| 2012/0203178 A1 | 8/2012 | Tverskoy |
| 2012/0215087 A1 | 8/2012 | Cobelli et al. |
| 2012/0225134 A1 | 9/2012 | Komorowski |
| 2012/0226259 A1 | 9/2012 | Yodfat et al. |
| 2012/0232520 A1 | 9/2012 | Sloan et al. |
| 2012/0238851 A1 | 9/2012 | Kamen et al. |
| 2012/0265166 A1 | 10/2012 | Yodfat |
| 2012/0271655 A1 | 10/2012 | Knobel et al. |
| 2012/0277667 A1 | 11/2012 | Yodat et al. |
| 2012/0277668 A1 | 11/2012 | Chawla |
| 2012/0282111 A1 | 11/2012 | Nip et al. |
| 2012/0295550 A1 | 11/2012 | Wilson et al. |
| 2013/0030358 A1 | 1/2013 | Yodfat et al. |
| 2013/0030841 A1 | 1/2013 | Bergstrom et al. |
| 2013/0036100 A1 | 2/2013 | Nagpal et al. |
| 2013/0060194 A1 | 3/2013 | Rostein |
| 2013/0080832 A1 | 3/2013 | Dean et al. |
| 2013/0138452 A1 | 5/2013 | Cork et al. |
| 2013/0158503 A1 | 6/2013 | Kanderian, Jr. et al. |
| 2013/0173473 A1 | 7/2013 | Birtwhistle et al. |
| 2013/0178791 A1 | 7/2013 | Javitt |
| 2013/0204130 A1 | 8/2013 | Mcarthur et al. |
| 2013/0231642 A1 | 9/2013 | Doyle et al. |
| 2013/0245545 A1 | 9/2013 | Arnold et al. |
| 2013/0253472 A1 | 9/2013 | Cabiri |
| 2013/0261406 A1 | 10/2013 | Rebec et al. |
| 2013/0274576 A1 | 10/2013 | Amirouche et al. |
| 2013/0296823 A1 | 11/2013 | Melker et al. |
| 2013/0317753 A1 | 11/2013 | Kamen et al. |
| 2013/0338576 A1 | 12/2013 | OConnor et al. |
| 2014/0005633 A1 | 1/2014 | Finan |
| 2014/0012119 A1 | 1/2014 | Geaghan et al. |
| 2014/0054883 A1 | 2/2014 | Lanigan et al. |
| 2014/0066886 A1 | 3/2014 | Roy et al. |
| 2014/0074033 A1 | 3/2014 | Sonderegger et al. |
| 2014/0078263 A1 | 3/2014 | Kim |
| 2014/0114277 A1 | 4/2014 | Eggert et al. |
| 2014/0121635 A1 | 5/2014 | Hayter |
| 2014/0128839 A1 | 5/2014 | Dilanni et al. |
| 2014/0131199 A1 | 5/2014 | Simmons et al. |
| 2014/0135880 A1 | 5/2014 | Baumgartner et al. |
| 2014/0146202 A1 | 5/2014 | Boss et al. |
| 2014/0148784 A1 | 5/2014 | Anderson et al. |
| 2014/0163664 A1 | 6/2014 | Goldsmith |
| 2014/0180203 A1 | 6/2014 | Budiman et al. |
| 2014/0180240 A1 | 6/2014 | Finan et al. |
| 2014/0200426 A1 | 7/2014 | Taub et al. |
| 2014/0200559 A1 | 7/2014 | Doyle et al. |
| 2014/0230021 A1 | 8/2014 | Birthwhistle et al. |
| 2014/0254170 A1 | 9/2014 | Celentano et al. |
| 2014/0276554 A1 | 9/2014 | Finan et al. |
| 2014/0276556 A1 | 9/2014 | Saint et al. |
| 2014/0278123 A1 | 9/2014 | Prodhom et al. |
| 2014/0296787 A1 | 10/2014 | Agard et al. |
| 2014/0309615 A1 | 10/2014 | Mazlish |
| 2014/0316379 A1 | 10/2014 | Sonderegger et al. |
| 2014/0325065 A1 | 10/2014 | Birthwhistle et al. |
| 2015/0018633 A1 | 1/2015 | Kovachev et al. |
| 2015/0025329 A1 | 1/2015 | Amarasingham et al. |
| 2015/0025495 A1 | 1/2015 | Peyser |
| 2015/0038898 A1 | 2/2015 | Palmer et al. |
| 2015/0057913 A1 | 2/2015 | Benhammou |
| 2015/0119666 A1 | 4/2015 | Brister et al. |
| 2015/0120317 A1 | 4/2015 | Mayou et al. |
| 2015/0134265 A1 | 5/2015 | Kohlbrecher et al. |
| 2015/0165119 A1 | 6/2015 | Palerm et al. |
| 2015/0173674 A1 | 6/2015 | Hayes et al. |
| 2015/0213217 A1 | 7/2015 | Amarasingham et al. |
| 2015/0217052 A1 | 8/2015 | Keenan et al. |
| 2015/0217053 A1 | 8/2015 | Booth et al. |
| 2015/0265767 A1 | 9/2015 | Vazquez et al. |
| 2015/0283335 A1 | 10/2015 | Lin |
| 2015/0290391 A1 | 10/2015 | Schmid et al. |
| 2015/0306314 A1 | 10/2015 | Doyle et al. |
| 2015/0338349 A1 | 11/2015 | Carter et al. |
| 2015/0351671 A1 | 12/2015 | Vanslyke et al. |
| 2015/0352282 A1* | 12/2015 | Mazlish ............... G16H 40/63 |
| 2015/0361154 A1 | 12/2015 | Jowett et al. |
| 2015/0366945 A1 | 12/2015 | Greene |
| 2016/0015891 A1 | 1/2016 | Papiorek |
| 2016/0022905 A1 | 1/2016 | Nagar et al. |
| 2016/0038673 A1 | 2/2016 | Morales |
| 2016/0038689 A1 | 2/2016 | Lee et al. |
| 2016/0051749 A1 | 2/2016 | Istoc |
| 2016/0058941 A1 | 3/2016 | Wu et al. |
| 2016/0082187 A1 | 3/2016 | Schaible et al. |
| 2016/0089494 A1 | 3/2016 | Guerrini |
| 2016/0135747 A1 | 5/2016 | Frey et al. |
| 2016/0175520 A1 | 6/2016 | Palerm et al. |
| 2016/0184517 A1 | 6/2016 | Baek et al. |
| 2016/0228641 A1 | 8/2016 | Gescheit et al. |
| 2016/0243318 A1 | 8/2016 | Despa et al. |
| 2016/0256087 A1 | 9/2016 | Doyle et al. |
| 2016/0287512 A1 | 10/2016 | Cooper et al. |
| 2016/0302054 A1 | 10/2016 | Kimura et al. |
| 2016/0310665 A1 | 10/2016 | Hwang et al. |
| 2016/0331310 A1 | 11/2016 | Kovatchev |
| 2016/0339172 A1 | 11/2016 | Michaud et al. |
| 2016/0354543 A1 | 12/2016 | Cinar et al. |
| 2017/0028132 A1 | 2/2017 | Cronenberg et al. |
| 2017/0049386 A1 | 2/2017 | Abraham et al. |
| 2017/0106138 A1 | 4/2017 | Cabiri |
| 2017/0143899 A1 | 5/2017 | Gondhalekar et al. |
| 2017/0143900 A1 | 5/2017 | Rioux et al. |
| 2017/0156682 A1 | 6/2017 | Doyle et al. |
| 2017/0173261 A1 | 6/2017 | OConnor et al. |
| 2017/0189270 A1 | 7/2017 | Nazzaro et al. |
| 2017/0189625 A1 | 7/2017 | Cirillo et al. |
| 2017/0214584 A1 | 7/2017 | Kanojia et al. |
| 2017/0234858 A1 | 8/2017 | Depa et al. |
| 2017/0281877 A1 | 10/2017 | Marlin et al. |
| 2017/0296746 A1 | 10/2017 | Chen et al. |
| 2017/0311903 A1 | 11/2017 | Davis et al. |
| 2017/0348479 A1 | 12/2017 | Choate et al. |
| 2017/0348482 A1 | 12/2017 | Duke et al. |
| 2017/0354785 A1 | 12/2017 | Gazeley et al. |
| 2018/0015274 A1 | 1/2018 | Haury et al. |
| 2018/0036495 A1 | 2/2018 | Searle et al. |
| 2018/0040255 A1 | 2/2018 | Freeman et al. |
| 2018/0075200 A1 | 3/2018 | Davis et al. |
| 2018/0075201 A1 | 3/2018 | Davis et al. |
| 2018/0075202 A1 | 3/2018 | Davis et al. |
| 2018/0092576 A1 | 4/2018 | O'Connor et al. |
| 2018/0126073 A1 | 5/2018 | Wu et al. |
| 2018/0169334 A1 | 6/2018 | Grosman et al. |
| 2018/0200434 A1 | 7/2018 | Mazlish et al. |
| 2018/0200438 A1 | 7/2018 | Mazlish et al. |
| 2018/0200441 A1 | 7/2018 | Desborough et al. |
| 2018/0204636 A1 | 7/2018 | Edwards et al. |
| 2018/0207357 A1 | 7/2018 | John |
| 2018/0236173 A1 | 8/2018 | Mccaffrey et al. |
| 2018/0256815 A1 | 9/2018 | Nazzaro |
| 2018/0277253 A1 | 9/2018 | Gondhalekar et al. |
| 2018/0280609 A1 | 10/2018 | Nishimura et al. |
| 2018/0289891 A1 | 10/2018 | Finan et al. |
| 2018/0296757 A1 | 10/2018 | Finan et al. |
| 2018/0307515 A1 | 10/2018 | Meller et al. |

(56) References Cited

U.S. PATENT DOCUMENTS

| | | | |
|---|---|---|---|
| 2018/0342317 A1 | 11/2018 | Skirble et al. |
| 2018/0369479 A1 | 12/2018 | Hayter et al. |
| 2019/0022317 A1 | 1/2019 | Uddin et al. |
| 2019/0076600 A1 | 3/2019 | Grosman et al. |
| 2019/0091404 A1 | 3/2019 | Nazzaro et al. |
| 2019/0132801 A1 | 5/2019 | Kamath et al. |
| 2019/0167895 A1 | 6/2019 | Dechellette et al. |
| 2019/0240403 A1 | 8/2019 | Palerm et al. |
| 2019/0240417 A1 | 8/2019 | Hostettler et al. |
| 2019/0290844 A1 | 9/2019 | Monirabbasi et al. |
| 2019/0321545 A1 | 10/2019 | Saint |
| 2019/0336683 A1 | 11/2019 | O'Connor et al. |
| 2019/0336684 A1 | 11/2019 | O'Connor et al. |
| 2019/0348157 A1 | 11/2019 | Booth et al. |
| 2020/0046268 A1 | 2/2020 | Patek et al. |
| 2020/0101222 A1 | 4/2020 | Lintereur et al. |
| 2020/0101223 A1 | 4/2020 | Lintereur et al. |
| 2020/0101225 A1 | 4/2020 | O'Connor et al. |
| 2020/0197605 A1 | 6/2020 | Haidar |
| 2020/0219625 A1 | 7/2020 | Kahlbaugh |
| 2020/0261643 A1 | 8/2020 | Boyaval et al. |
| 2020/0281538 A1 | 9/2020 | Schewenker et al. |
| 2020/0342974 A1 | 10/2020 | Chen et al. |
| 2021/0050085 A1 | 2/2021 | Hayter et al. |
| 2021/0098105 A1 | 4/2021 | Lee et al. |
| 2022/0023536 A1 | 1/2022 | Graham et al. |

FOREIGN PATENT DOCUMENTS

| | | |
|---|---|---|
| CA | 2863379 A1 | 8/2013 |
| CN | 1297140 A | 5/2001 |
| CN | 201134101 Y | 10/2008 |
| DE | 19756872 A1 | 7/1999 |
| EP | 0341049 A2 | 11/1989 |
| EP | 0496305 A2 | 7/1992 |
| EP | 0549341 A1 | 6/1993 |
| EP | 1491144 A1 | 12/2004 |
| EP | 0801578 B1 | 7/2006 |
| EP | 1762263 A1 | 3/2007 |
| EP | 1839694 A1 | 10/2007 |
| EP | 1852703 A1 | 11/2007 |
| EP | 2099384 A1 | 9/2009 |
| EP | 2139382 A1 | 1/2010 |
| EP | 2353628 A2 | 8/2011 |
| EP | 2397181 A1 | 12/2011 |
| EP | 2666520 A1 | 11/2013 |
| EP | 2695573 A2 | 2/2014 |
| EP | 1874390 B1 | 10/2014 |
| EP | 2830499 A1 | 2/2015 |
| EP | 2943149 A1 | 11/2015 |
| EP | 3068290 A1 | 9/2016 |
| EP | 3135965 A1 | 3/2017 |
| EP | 3177344 A1 | 6/2017 |
| EP | 3187201 A1 | 7/2017 |
| EP | 3314548 A1 | 5/2018 |
| EP | 3000497 A1 | 1/2019 |
| EP | 1571582 B1 | 4/2019 |
| EP | 2897071 B1 | 5/2019 |
| EP | 3598942 A1 | 1/2020 |
| EP | 3607985 A1 | 2/2020 |
| ES | 2559866 T3 | 2/2016 |
| FR | 2096275 A5 | 2/1972 |
| GB | 357139 A | 9/1931 |
| GB | 810488 A | 3/1959 |
| GB | 1401588 A | 7/1975 |
| GB | 2176595 A | 12/1986 |
| GB | 2443260 A | 4/2008 |
| GB | 2443261 A | 4/2008 |
| GB | 2461086 A | 12/2009 |
| GB | 2495014 A | 3/2013 |
| GB | 2524717 A | 10/2015 |
| GB | 2525149 A | 10/2015 |
| JP | 51125993 A | 11/1976 |
| JP | 02131777 A | 5/1990 |
| JP | 2001190659 A | 7/2001 |
| JP | 2003154190 A | 5/2003 |
| JP | 2007144141 A1 | 6/2007 |
| JP | 2004283378 A | 10/2007 |
| JP | 2007307359 A | 11/2007 |
| JP | 2008242502 A | 10/2008 |
| JP | 2009523535 A | 6/2009 |
| JP | 2012210441 A | 11/2012 |
| JP | 2017525451 A | 9/2017 |
| JP | 2018153569 A | 10/2018 |
| JP | 2019525276 A | 9/2019 |
| TW | 200740148 A | 10/2007 |
| TW | M452390 U | 5/2013 |
| WO | 9800193 A1 | 1/1998 |
| WO | 9801071 A1 | 1/1998 |
| WO | 9819145 A1 | 5/1998 |
| WO | 9824495 A1 | 6/1998 |
| WO | 9841267 A1 | 9/1998 |
| WO | 9956803 A1 | 11/1999 |
| WO | 0010628 A2 | 3/2000 |
| WO | 0013580 A1 | 3/2000 |
| WO | 0019887 A1 | 4/2000 |
| WO | 0030705 A1 | 6/2000 |
| WO | 200032258 A1 | 6/2000 |
| WO | 0061215 A1 | 10/2000 |
| WO | 0078210 A1 | 12/2000 |
| WO | 0172354 A2 | 10/2001 |
| WO | 2002015954 A1 | 2/2002 |
| WO | 2002043866 A2 | 6/2002 |
| WO | 2002082990 A1 | 10/2002 |
| WO | 2003016882 A1 | 2/2003 |
| WO | 2003039362 A1 | 5/2003 |
| WO | 2003045233 A1 | 6/2003 |
| WO | 2004043250 A1 | 5/2004 |
| WO | 2005110601 A1 | 5/2004 |
| WO | 2004092715 A1 | 10/2004 |
| WO | 2005031631 A2 | 4/2005 |
| WO | 2005051170 A2 | 6/2005 |
| WO | 2005082436 A1 | 9/2005 |
| WO | 2005113036 A1 | 12/2005 |
| WO | 2006053007 A2 | 5/2006 |
| WO | 2006060668 A2 | 6/2006 |
| WO | 2007064835 A2 | 6/2007 |
| WO | 2007078937 A1 | 7/2007 |
| WO | 2007084214 A1 | 7/2007 |
| WO | 2007092618 A2 | 8/2007 |
| WO | 2007112034 A2 | 10/2007 |
| WO | 2008024810 A2 | 2/2008 |
| WO | 2008024814 A2 | 2/2008 |
| WO | 2008029403 A1 | 3/2008 |
| WO | 2008133702 A1 | 11/2008 |
| WO | 2009023634 A2 | 2/2009 |
| WO | 2009032399 A1 | 3/2009 |
| WO | 2009045462 A1 | 4/2009 |
| WO | 2009049252 A1 | 4/2009 |
| WO | 2009066287 A3 | 5/2009 |
| WO | 2009066288 A1 | 5/2009 |
| WO | 2009098648 A2 | 8/2009 |
| WO | 2009134380 A2 | 11/2009 |
| WO | 2010025433 A1 | 3/2010 |
| WO | 2010053702 A1 | 5/2010 |
| WO | 2010078434 A2 | 7/2010 |
| WO | 2010132077 A1 | 11/2010 |
| WO | 2010138848 A1 | 12/2010 |
| WO | 2010146579 A1 | 12/2010 |
| WO | 2010147659 A2 | 12/2010 |
| WO | 2011012465 A1 | 2/2011 |
| WO | 2011095483 A1 | 8/2011 |
| WO | 2011133823 A1 | 10/2011 |
| WO | 2012045667 A2 | 4/2012 |
| WO | 2012108959 A1 | 8/2012 |
| WO | 2012134588 A1 | 10/2012 |
| WO | 2012177353 A1 | 12/2012 |
| WO | 2012178134 A2 | 12/2012 |
| WO | 2013078200 A1 | 5/2013 |
| WO | 2013134486 A2 | 9/2013 |
| WO | 2013149186 A1 | 10/2013 |
| WO | 20130149186 A1 | 10/2013 |
| WO | 2013177565 A1 | 11/2013 |
| WO | 2013182321 A1 | 12/2013 |

(56) References Cited

FOREIGN PATENT DOCUMENTS

| | | |
|---|---|---|
| WO | 2014109898 A1 | 7/2014 |
| WO | 2014110538 A1 | 7/2014 |
| WO | 2014136105 A1 | 9/2014 |
| WO | 2014194183 A2 | 12/2014 |
| WO | 2015056259 A1 | 4/2015 |
| WO | 2015061493 A1 | 4/2015 |
| WO | 2015073211 A1 | 5/2015 |
| WO | 2015081337 A2 | 6/2015 |
| WO | 2015187366 A1 | 12/2015 |
| WO | 2015187793 A1 | 12/2015 |
| WO | 2016004088 A1 | 1/2016 |
| WO | 2016022650 A1 | 2/2016 |
| WO | 2016041873 A1 | 3/2016 |
| WO | 2016089702 A1 | 6/2016 |
| WO | 2016141082 A1 | 9/2016 |
| WO | 2016161254 A1 | 10/2016 |
| WO | 2016181384 A2 | 11/2016 |
| WO | 2017004278 A1 | 1/2017 |
| WO | 2017089289 A1 | 6/2017 |
| WO | 2017091624 A1 | 6/2017 |
| WO | 2017105600 A1 | 6/2017 |
| WO | 2017184988 A1 | 10/2017 |
| WO | 2017205816 A1 | 11/2017 |
| WO | 2018009614 A1 | 1/2018 |
| WO | 2018067748 A1 | 4/2018 |
| WO | 2018120104 A1 | 7/2018 |
| WO | 2018136799 A1 | 7/2018 |
| WO | 2018204568 A1 | 11/2018 |
| WO | 2019043702 A1 | 3/2019 |
| WO | 2019077482 A1 | 4/2019 |
| WO | 2019094440 A1 | 5/2019 |
| WO | 2019195521 A1 | 10/2019 |
| WO | 2019213493 A1 | 11/2019 |
| WO | 2019246381 A1 | 12/2019 |
| WO | 2020081393 A1 | 4/2020 |
| WO | 2020124058 A1 | 6/2020 |
| WO | 2021011738 A1 | 1/2021 |

OTHER PUBLICATIONS

Unger, Jeff, et al., "Glucose Control in the Hospitalized Patient," Emerg. Med 36(9):12-18 (2004).
"Glucommander FAQ" downloaded from https://adaendo.com/GlucommanderFAQ.html on Mar. 16, 2009.
Finfer, Simon & Heritier, Stephane. (2009). The Nice-Sugar (Normoglycaemia in Intensive Care Evaluation and Survival Using Glucose Algorithm Regulation) Study: statistical analysis plan. Critical care and resuscitation : journal of the Australasian Academy of Critical Care Medicine. 11. 46-57.
Letters to the Editor regarding "Glucose Control in Critically Ill Patients," N Engl J Med 361: 1, Jul. 2, 2009.
"Medtronic is Leading a Highly Attractive Growth Market," Jun. 2, 2009.
Davidson, Paul C., et al. "Glucommander: An Adaptive, Computer-Directed System for IV Insulin Shown to be Safe, Simple, and Effective in 120,618 Hours of Operation," Atlanta Diabetes Associates presentation.
Davidson, Paul C., et al. "Pumpmaster and Glucommander," presented at the MiniMed Symposium, Atlanta GA, Dec. 13, 2003.
Kanji S., et al. "Reliability of point-of-care testing for glucose measurement in critically ill adults," Critical Care Med, vol. 33, No. 12, pp. 2778-2785, 2005.
Krinsley James S., "Severe hypoglycemia in critically ill patients: Risk factors and outcomes," Critical Care Med, vol. 35, No. 10, pp. 1-6, 2007.
International Search Report and Written Opinion for the International Patent Application No. PCT/US2021/016283, mailed Jun. 2, 2021, 15 pages.
Farkas et al. "Single-Versus Triple-Lumen Central Catheter-Related Sepsis: A Prospective Randomized Study in a Critically Ill Population" The American Journal of Medicine, Sep. 1992, vol. 93, p. 277-282.

Davidson, Paul C., et al., A computer-directed intravenous insulin system shown to be safe, simple, and effective in 120,618 h of operation, Diabetes Care, vol. 28, No. 10, Oct. 2005, pp. 2418-2423.
R Anthony Shaw, et al., "Infrared Spectroscopy in Clinical and Dianostic Analysis," Encyclopedia of Analytical Chemistry, ed. Robert A. Meyers, John Wiley & Sons, Ltd., pp. 1-20, 2006.
Gorke, A "Microbial Contamination of Haemodialysis Catheter Connections" Journal of Renal Care, European Dialysis & Transplant Nurses Association.
Lovich et al. "Central venous catheter infusions: A laboratory model shows large differences in drug delivery dynamics related to catheter dead volume" Critical Care Med 2007 vol. 35, No. 12.
Van Den Berghe, Greet, M.D., Ph.D., et al., Intensive Insulin Therapy in Critically Ill Patients, The New England Journal of Medicine, vol. 345, No. 19, Nov. 8, 2001, pp. 1359-1367.
Schlegel et al., "Multilumen Central Venous Catheters Increase Risk for Catheter-Related Bloodstream Infection: Prospective Surveillance Study" Infection 2008; 36: 322-327.
Wilson, George S., et al., Progress toward the Development of an Implantable Sensor for Glucose, Clin. Chem., vol. 38, No. 9, 1992, pp. 1613-1617.
Yeung et al. "Infection Rate for Single Lumen v Triple Lumen Subclavian Catheters" Infection Control and Hospital Epidemiology, vol. 9, No. 4 (Apr. 1988) pp. 154-158 The University of Chicago Press.
International Search Report and Written Opinion, International Application No. PCT/US2010/033794 mailed Jul. 16, 2010 (OPTIS. 247VPC).
International Search Report and Written Opinion in PCT/US2008/079641 (Optis.203VPC) dated Feb. 25, 2009.
Berger, "Measurement of Analytes in Human Serum and Whole Blood Samples by Near-Infrared Raman Spectroscopy," Ph.D. Thesis, Massachusetts Institute of Technology, Chapter 4, pp. 50-73, 1998.
Berger, "An Enhanced Algorithm for Linear Multivariate Calibration," Analytical Chemistry, vol. 70, No. 3, pp. 623-627, Feb. 1, 1998.
Billman et. al., "Clinical Performance of an in line Ex-Vivo Point of Care Monitor: A Multicenter Study," Clinical Chemistry 48: 11, pp. 2030-2043, 2002.
Widness et al., "Clinical Performance on an In-Line Point-of-Care Monitor in Neonates"; Pediatrics, vol. 106, No. 3, pp. 497-504, Sep. 2000.
Finkielman et al., "Agreement Between Bedside Blood and Plasma Glucose Measurement in the ICU Setting"; retrieved from http://www.chestjournal.org; CHEST/127/5/May 2005.
Glucon Critical Care Blood Glucose Monitor; Glucon; retrieved from http://www.glucon.com.
Fogt, et al., "Development and Evaluation of a Glucose Analyzer for a Glucose-Controlled Insulin Infusion System (Biostator)"; Clinical Chemistry, vol. 24, No. 8, pp. 1366-1372, 1978.
Vonach et al., "Application of Mid-Infrared Transmission Spectrometry to the Direct Determination of Glucose in Whole Blood," Applied Spectroscopy, vol. 52, No. 6, 1998, pp. 820-822.
Muniyappa et al., "Current Approaches for assessing insulin sensitivity and resistance in vivo: advantages, limitations, and appropriate usage," AJP-Endocrinol Metab, vol. 294, E15-E26, first published Oct. 23, 2007.
International Preliminary Report on Patentability for the International Patent Application No. PCT/US2019/053603, mailed Apr. 8, 2021, 9 pages.
International Search Report and Written Opinion for the International Patent Application No. PCT/US2019/053603, mailed Jan. 7, 2020, 16 pages.
Dassau et al., "Detection of a meal using continuous glucose monitoring: Implications for an artificial [beta]-cell." Diabetes Care, American Diabetes Association, Alexandria, VA, US, 31(2):295-300 (2008).
Cameron et al., "Probabilistic Evolving Meal Detection and Estimation of Meal Total Glucose Appearance Author Affiliations", J Diabetes Sci and Tech, vol. Diabetes Technology Society ;(5):1022-1030 (2009).

(56) References Cited

OTHER PUBLICATIONS

Lee et al., "A closed-loop artificial pancreas based on model predictive control: Human-friendly identification and automatic meal disturbance rejection", Biomedical Signal Processing and Control, Elsevier, Amsterdam, NL, 4 (4):1746-8094 (2009).
Anonymous: "Fuzzy control system", Wikipedia, Jan. 10, 2020. URL: https://en.wikipedia.org/w/index.php?title=Fuzzy_control_system&oldid=935091190.
An Emilia Fushimi: "Artificial Pancreas: Evaluating the ARG Algorithm Without Meal Annoucement", Journal of Diabetes Science and Technology Diabetes Technology Society, Mar. 22, 2019, pp. 1025-1043.
International Search Report and Written Opinion for the InternationalPatent Application No. PCT/US2021/017441, mailed May 25, 2021, 12 pages.
Mirko Messori et al: "Individualized model predictive control for the artificial pancreas: In silico evaluation of closed-loop glucose control", IEEE Control Systems, vol. 38, No. 1, Feb. 1, 2018, pp. 86-104.
International Search Report and Written Opinion for the International Patent Application No. PCT/US2021/017662, mailed May 26, 2021, 14 pages.
Anonymous: "Reservoir Best Practice and Top Tips" Feb. 7, 2016, URL: https://www.medtronic-diabetes.co.uk/blog/reservoir-best-practice-and-top-tips, p. 1.
Gildon Bradford: "InPen Smart Insulin Pen System: Product Review and User Experience" Diabetes Spectrum, vol. 31, No. 4, Nov. 15, 2018, pp. 354-358.
International Search Report and Written Opinion for the International Patent Application No. PCT/US2021/016050, mailed May 27, 2021, 16 pages.
International Search Report and Written Opinion for the International Patent Application No. PCT/US2020/065226, mailed May 31, 2021, 18 pages.
International Search Report and Written Opinion for the International Patent Application No. PCT/US2021/017659, mailed May 31, 2021, 13 pages.
Montaser Eslam et al., "Seasonal Local Models for Glucose Prediction in Type 1 Diabetes", IEE Journal of Biomedical and Health Informatics, IEEE, Piscataway, NJ, USA, vol. 24, No. 7, Nov. 29, 2019, pp. 2064-2072.
Samadi Sediqeh et al., "Automatic Detection and Estimation of Unannouced Meals for Multivariable Artificial Pancreas System", Diabetis Technology & Therapeutics, vol. 20m No. 3, Mar. 1, 2018, pp. 235-246.
Samadi Sediqeh et al., "Meal Detection and Carbohydrate Estimation Using Continuous Glucose Sensor Data" IEEE Journal of Biomedical and Health Informatics, IEEE, Piscataway, NJ, USA, vol. 21, No. 3, May 1, 2017, pp. 619-627.
Khodaei et al., "Physiological Closed-Loop Contol (PCLC) Systems: Review of a Modern Frontier in Automation", IEEE Access, IEEE, USA, vol. 8, Jan. 20, 2020, pp. 23965-24005.
E. Atlas et al., "MD-Logic Artificial Pancreas System: A pilot study in adults with type 1 diabetes", Diabetes Care, vol. 33, No. 5, Feb. 11, 2010, pp. 1071-1076.
International Search Report and Written Opinion for International Patent Application No. PCT/US2022/029012, mailed Aug. 19, 2022, 12 pages.
Fox, Ian G.; Machine Learning for Physiological Time Series: Representing and Controlling Blood Glucose for Diabetes Management; University of Michigan. ProQuest Dissertations Publishing, 2020. 28240142. (Year: 2020).
Anonymous: "Artificial pancreas—Wikipedia", Mar. 13, 2018 (Mar. 13, 2018), XP055603712, Retrieved from the Internet: URL: https://en.wikipedia.org/wiki/Artificial_pancreas [retrieved on Jul. 9, 2019] section "Medical Equipment" and the figure labeled "The medical equipment approach to an artifical pancreas".

Kaveh et al., "Blood Glucose Regulation via Double Loop Higher Order Sliding Mode Control and Multiple Sampling Rate." Paper presented at the proceedings of the 17th IFAC World Congress, Seoul, Korea (Jul. 2008).
Dassau et al., "Real-Time Hypoglycemia Prediction Suite Using Contineous Glucose Monitoring," Diabetes Care, vol. 33, No. 6, 1249-1254 (2010).
International Search Report and Written Opinion for International Patent Application No. PCT/US17/53262, mailed on Dec. 13, 2017, 8 pages.
Van Heusden et al., "Control-Relevant Models for Glucose Control using A Priori Patient Characteristics", IEEE Transactions on Biomedical Engineering, vol. 59, No. 7, (Jul. 1, 2012) pp. 1839-1849.
Doyle III et al., "Run-to-Run Control Strategy for Diabetes Management." Paper presented at 23rd Annual International Conference of the IEEE Engineering in Medicine and Biology Society, Istanbul, Turkey. (Oct. 2001).
Bequette, B.W., and Desemone, J., "Intelligent Dosing Systems": Need for Design and Analysis Based on Control Theory, Diabetes Technology and Therapeutics 9(6): 868-873 (2004).
Parker et al., "A Model-Based Agorithm for Blood Gucose Control in Type 1 Diabetic Patients." IEEE Transactions on Biomedical Engineering, 46 (2) 148-147 (1999).
International Search Report and Written Opinion for International Patent Application No. PCT/US2017/015601, mailed May 16, 2017, 12 pages.
International Search Report and Written Opinion for the International Patent Application No. PCT/US2018/018901, mailed on Aug. 6, 2018, 12 pages.
International Search Report and Written Opinion for International Patent Application No. PCT/US2018/052467, mailed Jan. 4, 2019, 13 pages.
"How to Create a QR Code that Deep Links to Your Mobile App", Pure Oxygen Labs, web<https://pureoxygenlabs.com/how-to-create-a-qr-codes-that-deep-link-to-your-mobile-app/>. Year:2017.
"Read NFC Tags with an iPHone App on IOS 11", GoToTags, 11 Sep. 2017, web <https://gototags.com/blog/read-hfc-tags-with-an-iphone-app-on-ios-11/>. (Year:2017).
International Search Report and Written Opinion for International Patent Application No. PCT/US2016/063350, mailed on Mar. 27, 2017, 9 pages.
Extended Search Report mailed Aug. 13, 2018, issued in European Patent Application No. 16753053.4, 9 pages.
International Search Report and Written Opinion for International Patent Application No. PCT/US16/18452, mailed on Apr. 29, 2015, 9 pages.
International Preliminary Report on Patentability mailed Aug. 31, 2017, issued in PCT Patent Application No. PCT/US2016/018452, 7 pages.
International Search Report and Written Opinion for International Patent Application No. PCT/US2019/055862, mailed on Mar. 11, 2020.
International Search Report and Written Opinion for Application No. PCT/US2019/030562, Sep. 25, 2019, 19 pages.
International Preliminary Report on Patentability for the International Patent Application No. PCT/US2019/042160, mailed Jan. 28, 2021, 12 pages.
International Search Report and Written Opinion for the International Patent Application No. PCT/US2021/047695, mailed Jan. 31, 2022, 26 pages.
International Search Report and Written Opinion for the International Patent Application No. PCT/US21/064056, mailed Apr. 4, 2022, 12 pages.
Anonymous: "AndroidAPS ComponentOverview", AndroidAPS documentation, Nov. 12, 2020 (Nov. 12, 2020), pp. 1-7, Retrieved from the Internet: URL:https://github.com/openaps/AndroidAPSdocs/blob/199ef86a900adf4b3d9c32f605eb11047bd3d62f/docs/EN/Module/module.rst [retrieved on Apr. 11, 2022] the whole document.
International Search Report and Written Opinion for the International Patent Application No. PCT/US22/018700, mailed Jun. 7, 2022, 13 pages.

(56) References Cited

OTHER PUBLICATIONS

Legacy Med Search, Insulet Enrolls First Patients in Clinical Trial for Omnipod, Sep. 16, 2016, available at URL: https://legacymedsearch.com/insulet-enrolls-first-patients-in-clinical trial-for-omnipod-artificial-pancreas-system/.
International Search Report and Written Opinion for the International Patent Application No. PCT/US2020/052125, mailed Aug. 12, 2020, 15 pages.
International Search Report and Written Opinion for the International Patent Application No. PCT/US2020/050332, mailed Sep. 12, 2020, 12 pages.
European Patent Office, "Notification of Transmittal of the ISR and the Written Opinion of the International Searching Authority, or the Declaration," in PCT Application No. PCT/GB2015/050248, Jun. 23, 2015, 12 pages.
International Search Report and Written Opinion for the International Patent Application No. PCT/US2021/012246, mailed Apr. 13, 2021, 15 pages.
International Search Report and Written Opinion for the International Patent Application No. PCT/US2021/013639, mailed Apr. 28, 2021, 14 pages.
International Search Report and Written Opinion for the International Patent Application No. PCT/US2020/063326, mailed May 3, 2021, 17 pages.
European Search Report for the European Patent Application No. 21168591, mailed Oct. 13, 2021, 4 pages.
International Search Report and Written Opinion for the International Patent Application No. PCT/US2021/041954, mailed Oct. 25, 2021, 13 pages.
International Search Report and Written Opinion for the International Patent Application No. PCT/US2021/022694, mailed Jun. 25, 2021, 13 pages.
International Search Report and Written Opinion for the International Patent Application No. PCT/US2021/017664, mailed May 26, 2021, 16 pages.
International Search Report and Written Opinion for the International Patent Application No. PCT/US2022/012896, mailed Apr. 22, 2022, 15 pages.
International Search Report and Written Opinion for the International Patent Application No. PCT/US2022/013470, mailed May 6, 2022, 14 pages.
International Search Report and Written Opinion for the International Patent Application No. PCT/US2022/013473, mailed May 6, 2022, 13 pages.
International Search Report and Written Opinion for the International Patent Application No. PCT/US2022/019079, mailed Jun. 2, 2022, 14 pages.
International Search Report and Written Opinion for the International Patent Application No. PCT/US2022/018453, mailed Jun. 2, 2022, 13 pages.
International Search Report and Written Opinion for the International Patent Application No. PCT/US22/019080, mailed Jun. 7, 2022, 14 pages.
International Search Report and Written Opinion for the International Patent Application No. PCT/US22/019664, mailed Jun. 7, 2022, 14 pages.
International Search Report and Written Opinion for International Patent Application No. PCT/US2021/051027, mailed on Jan. 7, 2022, 16 pages.
International Search Report and Written Opinion for International Patent Application No. PCT/US2021/052372, mailed Jan. 26, 2022, 15 pages.
International Search Report and Written Opinion for the International Patent Application No. PCT/US2021/046607, mailed Jan. 31, 2022, 20 pages.
International Search Report and Written Opinion for the International Patent Application No. PCT/US2021/055745, mailed Feb. 14, 2022, 13 pages.
International Search Report and Written Opinion for the International Patent Application No. PCT/US21/060618, mailed Mar. 21, 2022, 15 pages.
Herrero Pau et al: "Enhancing automatic closed-loop glucose control in type 1 diabetes with an adaptive meal bolus calculator—in silicoevaluation under intra-day variability", Computer Methods and Programs in Biomedicine, Elsevier, Amsterdam, NL, vol. 146, Jun. 1, 2017 (Jun. 1, 2017), pp. 125-131, XP085115607, ISSN: 0169-2607, DOI:10.1016/J.CMPB.2017.05.010.
Marie Aude Qemerais: "Preliminary Evaluation of a New Semi-Closed-Loop Insulin Therapy System over the prandial period in Adult Patients with type I diabetes: the WP6. 0 Diabeloop Study", Journal of Diabetes Science and Technology Diabetes Technology Society Reprints and permissions, Jan. 1, 2014, pp. 1177-1184, Retrieved from the Internet: URL:http://journals.sagepub.com/doi/pdf/10.1177/1932296814545668 [retrieved on Jun. 6, 2022] chapter "Functioning of the Algorithm" chapter "Statistical Analysis" p. 1183, left-hand column, line 16-line 23.
Anonymous: "Kernel density estimation", Wikipedia, Nov. 13, 2020 (Nov. 13, 2020), pp. 1-12, XP055895569, Retrieved from the Internet: URL:https://en.wikipedia.org/w/index.php?title=Kernel_density_estimation&oldid=988508333 [retrieved on Jun. 6, 2022].
Anonymous: "openaps / oref0 /lib/determine-basal-js", openaps repository, Nov. 9, 2019 (Nov. 9, 2019), pp. 1-17, XP055900283, Retrieved from the Internet: URL:https://github.com/openaps/oref0/blob/master/lib/determine-basal/determine-basal.js [retrieved on Jun. 6, 2022] line 116-line 118, line 439-line 446.
Anonymous: "AndroidAPS screens", AndroidAPS documentation, Oct. 4, 2020 (Oct. 4, 2020), pp. 1-12, XP055894824, Retrieved from the Internet: URL:https://github.com/openaps/AndroidAPSdocs/blob/25d8acf8b28262b411b34f416f173ac0814d7e14/docs/EN/Getting-Started/Screenshots.md [retrieved on Jun. 6, 2022].
Kozak Milos et al: "Issue #2473 of AndroidAPS", MilosKozak / AndroidAPS Public repository, Mar. 4, 2020 (Mar. 4, 2020), pp. 1-4, XP055900328, Retrieved from the Internet: URL:https://github.com/MilosKozak/AndroidAPS/issues/2473 [retrieved on Jun. 6, 2022].
International Search Report and Written Opinion for the International Patent Application No. PCT/US2021/052855, mailed Dec. 22, 2021, 11 pages.
International Search Report and Written Opinion for the International Patent Application No. PCT/US2021/047771, mailed Dec. 22, 2021, 11 pages.
Medication Bar Code System Implementation Planning Section I: A Bar Code Primer for Leaders, Aug. 2013.
Medication Bar Code System Implementation Planning Section II: Building the Case for Automated Identification of Medications, Aug. 2013.
Villareal et al. (2009) in: Distr. Comp. Art. Intell. Bioninf. Soft Comp. Amb. Ass. Living; Int. Work Conf. Art. Neural Networks (IWANN) 2009, Lect. Notes Comp. Sci. vol. 5518; S. Omatu et al. (Eds.), pp. 870-877.
International Search Report and Written Opinion for the International Patent Application No. PCT/US2021/047690, mailed Jan. 14, 2022, 13 pages.
International Search Report and Written Opinion for the International Patent Application No. PCT/US2022/055745, mailed Feb. 14, 2022, 13 pages.
International Search Report and Written Opinion for the International Patent Application No. PCT/US2021/053162, mailed Mar. 28, 2022, 18 pages.
International Search Report and Written Opinion for the International Patent Application No. PCT/US2021/064041, mailed Apr. 29, 2022, 11 pages.
International Search Report and Written Opinion for the International Patent Application No. PCT/US2022/015809, mailed Jun. 20, 2022, 15 pages.
European Search Report for the European Patent Application No. EP03743667, dated Jul. 22, 2008.
International Search Report and Written Opinion mailed Sep. 9, 2016, issued in PCT Patent Application No. PCT/US2016/037189, 12 pages.
Preliminary Report on Patentability mailed Dec. 21, 2017, issued in PCT Patent Application No. PCT/US2016/037189.

(56) References Cited

OTHER PUBLICATIONS

U.K. Intellectual Property Office, GB Application No. GB 1401587.9, "Search Report under Section 17(5)" Aug. 11, 2015, 1 page.
International Search Report and Written Opinion for PCT Application No. PCT/GB2015/050247, May 8, 2015, 14 pages.
Extended Search Report mailed Nov. 24, 2017, issued in European Patent Application No. 15779465.2, 10 pages.
International Search Report and Written Opinion for PCT Application No. PCT/US15/26875, mailed Jan. 18, 2016, 10 pages.
U.K. Intellectual Property Office, GB Application No. GB 1401588.7, "Search Report under Section 17(5)" Aug. 17, 2015, 1 page.
U.K. Intellectual Property Office, GB Application No. GB 1401589.5, "Search Report under Section 17" Jul. 27, 2015, 1 page.
International Search Report and Written Opinion for PCT Application No. PCT/GB2015/050250, May 7, 2015, 9 pages.
3GPP TS 23.003 V10.0.0.0 Numbering, addressing and identification. Dec. 2010.
International Search Report and Written Opinion for PCT Application No. PCT/GB2015/050251, Jun. 12, 2015, 9 pages.
European Search Report for the European Patent Application No. EP19194241, dated Oct. 22, 2019, 6 pages.
International Preliminary Report on Patentability for PCT/US2017/061095, issued on May 14, 2019, 6 pages.
International Search Report and Written Opinion for PCT/US18/52468, mailed on Feb. 26, 2019, 16 pages.
International Search Report and Written Opinion for PCT/US2017/061095, mailed on Feb. 20, 2018, 8 pages.

\* cited by examiner

THRESHOLD BASED AUTOMATIC GLUCOSE CONTROL RESPONSE

RELATED APPLICATIONS

This application claims the benefit of U.S. Provisional Patent Application No. 63/194,381, filed May 28, 2021, the contents of which are incorporated herein by reference in their entirety.

BACKGROUND

Different diabetes management systems use a feedback loop control process that responds to rising, falling or steady blood glucose levels as reported by a continuous glucose monitor (CGM).

The steady and fixed interval readings from the CGM allows the control to maintain its internal state machine as well as maintain the control process's own trajectory for anticipated blood glucose trend and any anticipated bolus that may be required to make necessary corrections. However, there are pitfalls when the control process operates on a fixed time interval, such as the control process being more reactive in case of fixed CGM interval operation in responding to wider jumps in CGM values in case of meal or other events. Additionally, when the fixed interval is a large time interval, the consequence of a single "missing" CGM value causes a wider gap over which an artificial pancreas application interpolates future values. For example, when one CGM reading is missed in a 5-minute operation cycle, that one missing value translates into a 10-minute gap in CGM awareness.

It would be beneficial if blood glucose readings are processed more frequently to allow for a more rapid response by an artificial pancreas application. However, other considerations, such as power consumption and supply, affect how often readings can be provided by the CGM (as every reading and transmission of the reading consumes power) and how often each reading can be processed by a controller or a wearable drug delivery device since power is consumed every time a reading is processed.

BRIEF SUMMARY

In one aspect, a wearable drug delivery device is provided that includes a processor, a memory, a reservoir, a pump mechanism, and a communication circuit. The memory may store an automatic glucose control application, programming code, and data related to the automatic glucose control application. The reservoir may be shaped to contain a liquid drug. The pump mechanism may be controlled by the processor and may be operable to deliver the liquid drug. The communication circuit may be controlled by the processor and operable to communicate with an external device. When the processor executes the automatic glucose control application, the processor is operable to, for a period of time, receive a blood glucose measurement value at a set time interval within the period of time. The processor may determine a rate of change of the blood glucose measurement values received from the analyte sensor over the period of time. Based on the determined rate of change, the processor may select a different set time interval.

In another aspect, a non-transitory computer-readable storage medium is provided that includes instructions executable by a processor. When the instructions are executed by the processor, the processor is operable to receive a blood glucose measurement value from an analyte sensor remote from or integrated with the wearable drug delivery device over a span of time at a set time interval. The set time interval is selected by the processor. The processor may determine a rate of change of blood glucose measurement values received from the analyte sensor over a period of time that spans multiple time intervals, and based on the determined rate of change, select a different set time interval.

In yet another aspect, an analyte sensor is provided that includes logic circuitry, a sensor, and a communication circuit. The sensor may be coupled to the logic circuitry and be operable to detect an analyte measurement value from a blood sample of a user. The sensor is further operable to make the detection of the analyte measurement value at a set detection rate. The communication circuit may be coupled to the logic circuitry and be operable to transmit a signal containing the detected characteristic of the analyte. The logic circuitry may be operable to control the sensor including setting the detection rate of the sensor based on a selection from multiple detection rates. The logic circuitry may obtain the analyte measurement value from the sensor and determine a rate of change of analyte measurement values received over a period of time. Based on the determined rate of change, the logic circuitry may determine that delivery of a liquid drug is to be suspended and may generate a suspension signal. The logic circuitry may cause the communication circuit to transmit the suspension signal.

In further aspect, a non-transitory computer-readable storage medium is provided. The computer-readable storage medium may include instructions that, when executed by a processor or logic circuitry, cause the computer to determine that an event affecting a blood glucose measurement value trend of a user has occurred. Based on the occurrence of the event, the processor or the logic circuitry may be operable to select a mode of operation of the analyte sensor, and generate a signal indicating the selected mode of operation.

In another aspect, a wearable medical device is provided that includes a processor or logic circuitry. The wearable medical device may include a memory storing instructions that, when executed by the processor or logic circuitry, configure the wearable medical device to determine, by the processor or the logic circuitry, that an event affecting a blood glucose measurement value trend of a user has occurred Based on the occurrence of the event, the processor or the logic circuitry may select a mode of operation of the analyte sensor, and generate a signal indicating the selected mode of operation.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1A:
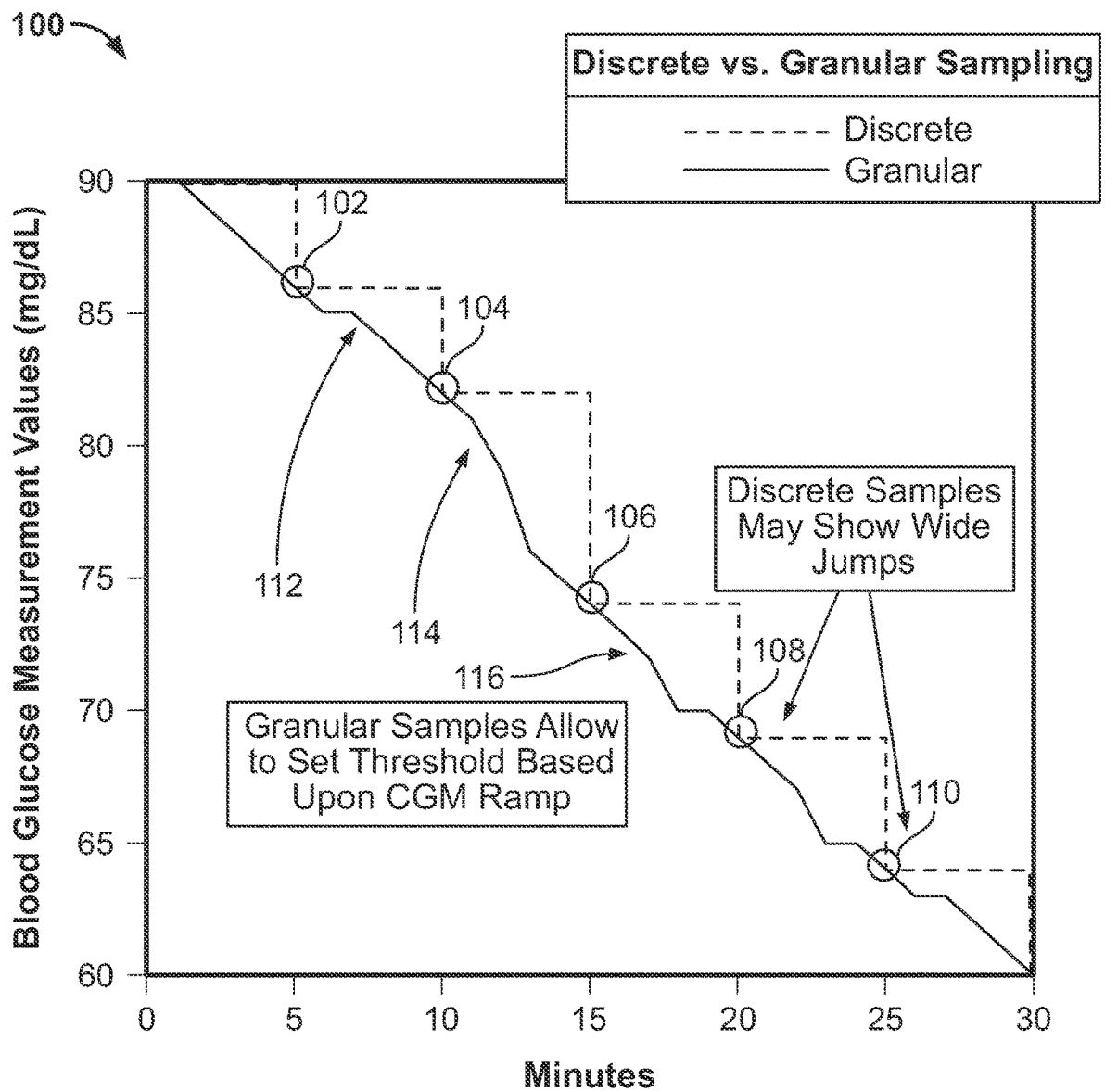
FIG. 1A shows a graphic of analyte sensor sampling at a first time interval compared to analyte sensor samples taken at a second time interval or substantially continuously.

The disclosed examples provide techniques that may be used with any additional algorithms or computer applications that manage blood glucose levels and insulin therapy. These algorithms and computer applications may be collectively referred to as "medication delivery algorithms" or "medication delivery applications" and may be operable to deliver different categories of drugs (or medications), such as chemotherapy drugs, pain relief drugs, diabetes treatment drugs (e.g., insulin, glucagon, pramlintide, glucagon-like peptides, or combinations thereof), blood pressure medication, or the like.

A type of medication delivery algorithm (MDA) may include an "artificial pancreas" algorithm-based system, or more generally, an artificial pancreas (AP) application. For ease of discussion, the computer programs and computer applications that implement the medication delivery algorithms or applications may be referred to herein as an "AP application." An AP application may be configured to provide automatic delivery of insulin or other diabetes treatment drugs based on signals received from an analyte sensor, such as a continuous blood glucose monitor (CGM), or the like. In an example, the artificial pancreas (AP) application may operate in cooperation with an automatic glucose control (AGC) application or algorithm. The AGC application when executed by a processor may enable monitoring of a user's blood glucose measurement values, determine an appropriate level of insulin for the user based on the monitored glucose values (e.g., blood glucose concentrations or blood glucose measurement values) and other information. Either alone or in cooperation with the AP application, the AGC application may be operable to maintain a user's blood glucose levels in range of a target blood glucose setting. The "target blood glucose setting" may be a setting that the AGC uses as an optimal blood glucose measurement value and performs different functions to maintain the user's blood glucose as close as possible to the setting. For example, a target blood glucose measurement value may be acceptable if it falls within the range of 110 mg/dL to 150 mg/dL, which is a range satisfying a clinical standard of care for treatment of diabetes as such the user's target blood glucose setting may be 120 mg/dL. In addition, an AGC application as described herein may be operable to determine when a user's blood glucose is getting into the hypoglycemic range (e.g., <70 mg/dL) or the hyperglycemic range (e.g., >180 mg/dL).

A system component for maintaining the user's blood glucose measurement values near the user's target blood glucose setting is a CGM. CGMs of today deliver at fixed intervals; however, eventually CGMs may be capable of performing more on-demand and more granular blood glucose measurements.

The advantages of the opportunity presented by receiving a blood glucose reading more frequently than every 5 minutes or at variable rates, such as 1 minute for a period of time (e.g., an hour), then 3 minutes for a next period, and then 5 minutes for another period or for the rest of the day or night, enables an AGC application to obtain more accurate and more frequent blood glucose readings, respond to readings more quickly always or during certain periods, thereby consuming less power. Receiving or sampling more frequently may also allow an AGC application to provide additional considerations such as triggering the more frequent reception or sampling upon certain thresholds. Moreover, in situations when there are missing readings from the CGM, a blood glucose measurement value from a most recent prior reading can be used by the AGC application to make delivery and/or sampling frequency determinations. As such, the capability to select a sampling frequency may be also be very effective to mitigate the effect of the missed reading.

By incorporating more precise and frequent readings, the AGC application can be more effective in predicting hypo- or hyper-glycemia, alert the user sooner, suspend or elevate drug deliveries more quickly, and not only improve time in range but add more safety for the user. For example, a wearable drug delivery device may be operable to control how often a CGM samples. If an AGC application executing on the wearable drug delivery device or a controller determines there is a reason for concern (e.g., a blood glucose measurement was not received, or the user is approaching or has entered a hypo- or hyper-glycemic range), the AGC application may issue a command signal to the CGM to begin sampling more frequently.

A difference two minutes, for example, when a user is experiencing an extreme negative rate of change of blood glucose measurement values, particularly when the user's blood glucose measurement values are close to the low blood glucose thresholds, can be the difference between a user being able to treat themselves and a user needing assistance or, perhaps, hospitalization.

As analyte sensor technology, and in particular, technology in wearable CGMs, advances, a processor in a wearable drug delivery device (shown and described with reference to a later example) may be operable to transition to obtaining more frequent blood glucose readings from the CGM. For example, the processor may be operable to select how often the processor should receive a blood glucose reading from the CGM. The processor may be further operable to apply the more frequently obtained blood glucose readings to determining how much medication (also referred to as "diabetes treatment drug," "liquid drug," "insulin," and "therapeutic drug" herein) should be delivered to the user and when. Alternatively, the processor may be able to more quickly and more precisely determine when a user is in danger of a hypo- or hyper-glycemic event and be able to halt or increase insulin delivery sooner.

Furthermore, the time needed by a processor in a wearable drug delivery device or controller to derive a CGM value with high confidence may be further reduced because further calculations are not needed since the extra samples reduces the number of missing measurements, errors in measurements and the like However, different conditions may affect the readings of the CGM, so at times the CGM may not be as accurate as other times, or as time goes on the accuracy of the CGM may diminish at an unknown rate and in a nonlinear manner, in which case, the processor may need additional time to derive a CGM value with the high confidence level. .

The possibility of on-demand readings from a CGM may be needed in certain scenarios. The on-demand reading may be more helpful in events such as a consumption (or imminent consumption) of a meal, participation in exercise, or imminent hypoglycemia. The process 200 provides an example of how a processor of the wearable drug delivery device may determine the need for more frequent readings from the CGM. Of course, another processor, such as a processor in the CGM or a controller device in an automatic medication delivery system, may be operable to receive and process blood glucose measurement values from a CGM.

FIG. 1A shows a graphic of sampling at a first time interval in comparison to samples taken at second time interval or substantially continuously. The chart 100 has blood glucose measurement values on the vertical axis ranging from 60 mg/dL to 90 mg/dL and time on the horizontal axis ranging from 0 to 30 minutes.

In the example shown in FIG. 1A, the processor may receive a blood glucose measurement value at the set time interval of every 5 minutes. For example, at samples 102, 104, 106, 108, and 110, blood glucose measurement value of approximately 86, 83, 74, 68, and 63, respectively, were obtained at 5-minute intervals. The samples 102-110 are shown on a stair-step line (top dashed line). This time interval of 5 minutes has been shown to consume power efficiently and allows for an appropriate reserve power, such as 10-20%, for contingency operations (e.g., additional processing time, communications, alerts or notifications, or the like). Chart 100 illustrates how sampling at the first interval, e.g., 5 minutes, slowly reveals a negative rate of change in blood glucose measurement values that may lead to a user's blood glucose falling below a hypoglycemic threshold, such as 60 mg/dL or 70 mg/dL.

Alternatively, or in addition, the analyte sensor or CGM may be operable to obtain blood glucose measurement values at smaller or more granular time intervals (e.g., every 1 minute compared to every 5 minutes), such as those shown by the lines 112, 114 and 116, which represent a trend of a number of blood glucose measurement values received or sampled, for example, every one minute.

Figure 1B:
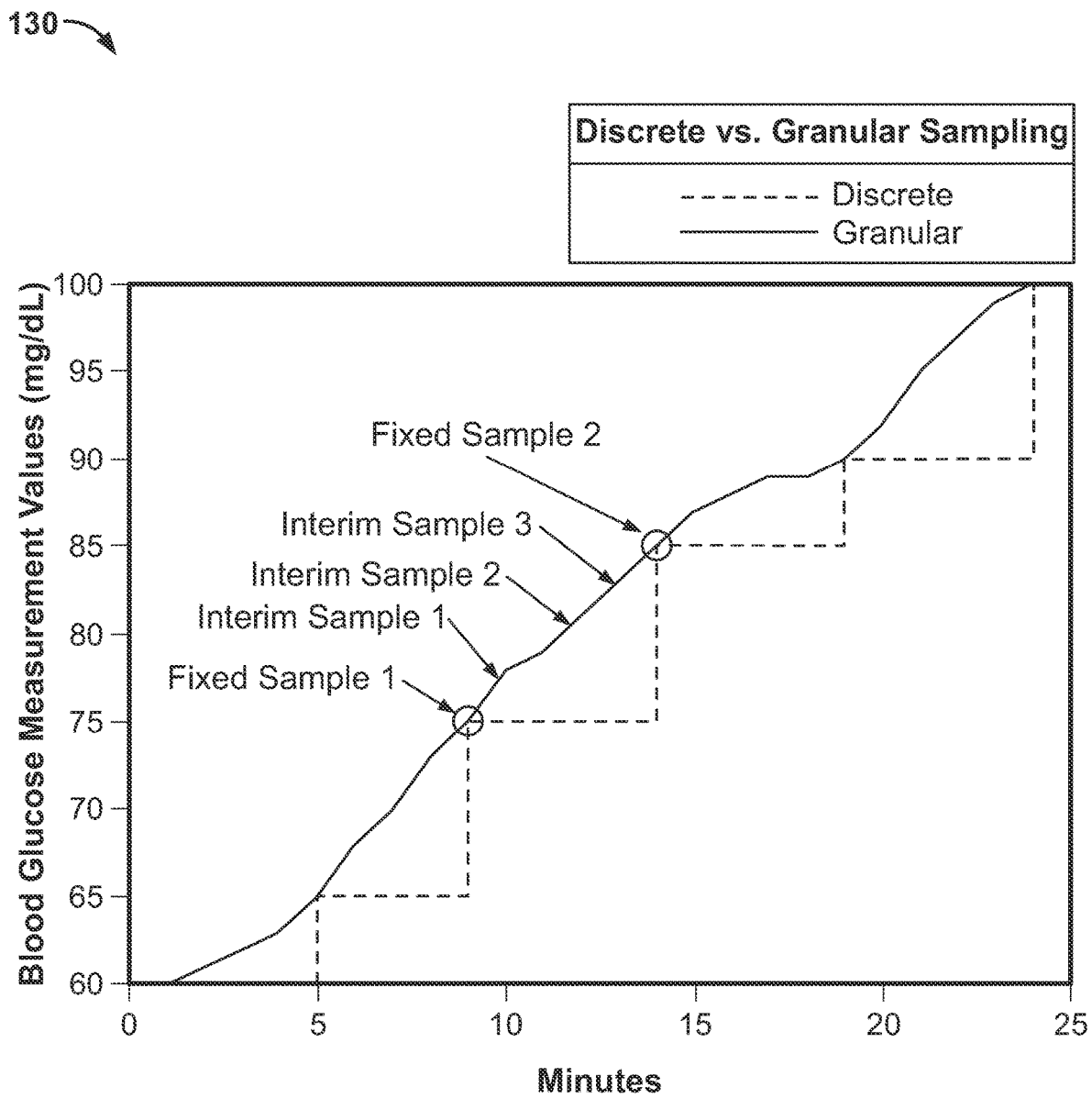
FIG. 1B illustrates another graphic of analyte sensor sampling at a first time interval compared to analyte sensor samples taken at a second time interval or substantially continuously.

FIG. 1B illustrates another graphic of analyte sensor sampling at a first time interval compared to analyte sensor samples taken at a second time interval or substantially continuously. In situation in which the blood glucose is exhibiting a rising trend (i.e., a positive rate of change) as illustrated in the chart 130 of FIG. 1B, the AGC application may benefit from obtaining CGM blood glucose measurement values sooner than at a fixed reading rate (such as that which may be provided by fixed sample 1 and fixed sample 2 because the AGC application may be able to deliver sub-microboluses which can avoid more reactive microboluses. A microbolus may be a dosage of insulin between 0.1-0.425 Units of insulin, while a sub-microbolus may be approximately 0.05-0.15 Units of insulin. The determination of a microbolus and sub-microbolus is described in more detail with reference to a later example. For example, the disclosed process provides an additional benefit of mitigating the effects of an estimated reading when there are missing blood glucose data points (for example, if fixed sample 2 was not received by a controller) or increasing blood glucose data points. For example, in the case of a rising blood glucose trend, the AGC can deliver a sub-microbolus sooner, such as a 0.3 mg/dL of medication. In example of FIG. 1B, if X is a future reactive micro-bolus to be delivered after interim sample 3, the AGC may apply threshold-based decisions using the values of interim sample 1 and interim sample 2 between fixed sample 1 and fixed sample 2 to determine a fast rising trend in the blood glucose. As a result of the determination, the AGC may determine that it is appropriate to deliver a sub-microbolus, which may be a medication dosage approximately equal to X/2, where X is considered as the reactive micro-bolus. By delivering more sub-boluses sooner, the future rising trend may be improved (i.e. reduced to become less steep or even plateau) sooner.

Figure 1C:
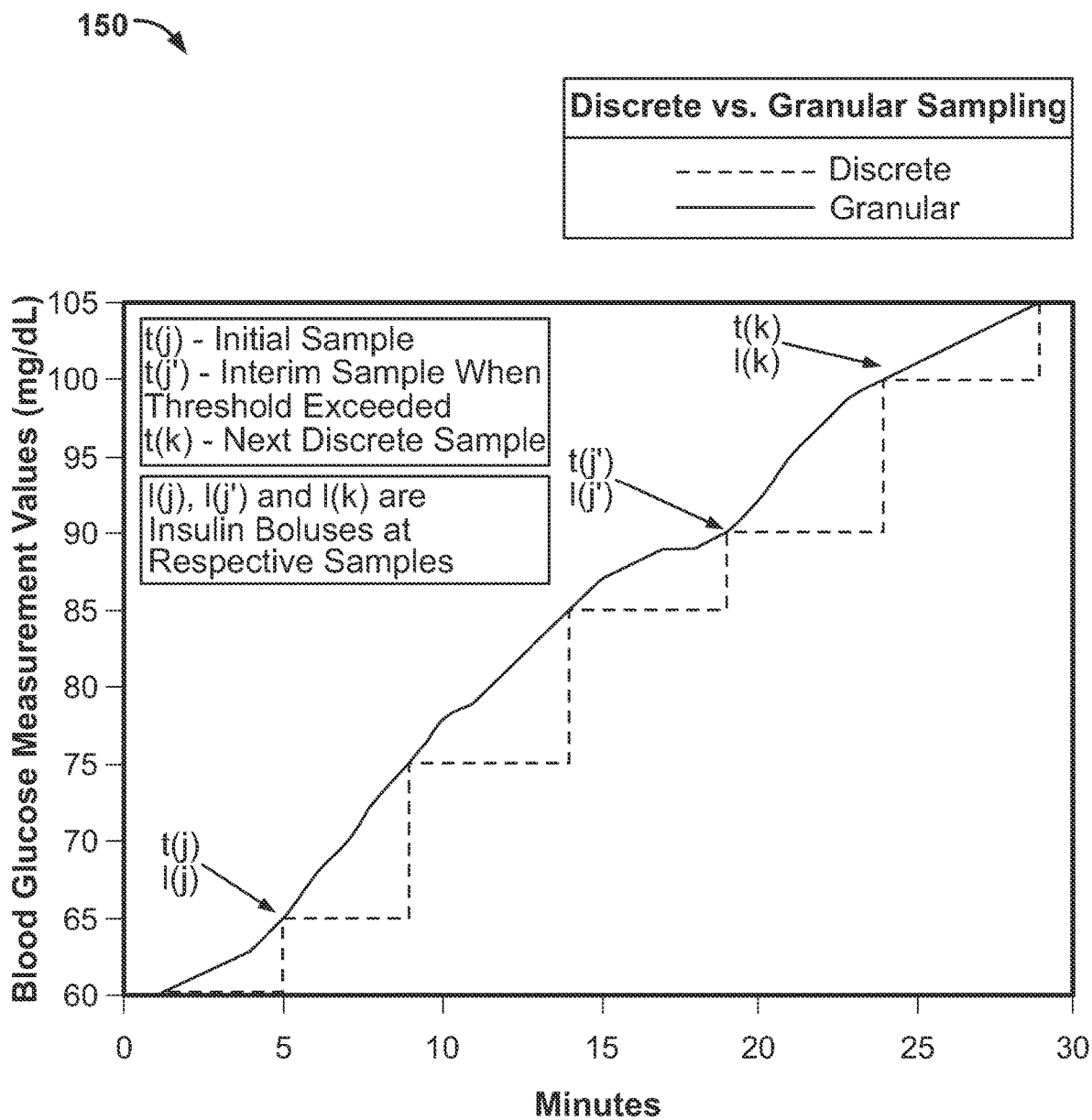
FIG. 1C illustrates timing and sampling examples related to the determination of a microbolus and sub-microbolus.

FIG. 1C illustrates timing and sampling examples related to the determination of a microbolus and sub-microbolus. As mentioned above, a microbolus may be a dosage of insulin between 0.1-0.425 U of insulin, while a sub-microbolus may be approximately 0.05-0.15 Units of insulin. The determination of a microbolus and sub-microbolus is described in more detail with reference to a later example.

The amount of insulin dose for a microbolus or sub-microbolus may be derived by considering IOB and IOB constraint is described in the following paragraphs.

The IOB required for a user may be determined according to Equation 1.

Equation (1) below is a modified version of a standard correction bolus calculation. Specifically, the amount of IOB required at a given time-step k (i.e., $IOB_{required}(k)$) is computed from the difference between the CGM value at time-step k (CGM(k)) and the glycemic setpoint ($G_{sp}$) divided by the insulin correction factor (CF). The IOB required ($IOB_{required}(k)$) is computed as follows:

$$IOB_{required}(k) = \frac{CGM(k) - G_{sp}}{CF} \text{ if } CGM(k) > G_{sp}, \quad \text{(Eq 1)}$$

where $IOB_{required}(k)=0$ if $CGM(k) \leq G_{sp}$, and $G_{sp}$ is the blood glucose set point.

An amount of IOB may be constrained using an IOB constraint. Subsequently, the IOB constraint $I_{IOB}(k)$ at time-step k is the IOB required ($IOB_{required}(k)$) minus the IOB in units of insulin per time-step k computed as follows:

$$I_{IOB}(k) = IOB_{required}(k) - IOB(k) + \frac{1}{12}I_{basal}^{hourly} \text{ if } IOB_{required} > IOB, \quad \text{(Eq. 2)}$$

$$\text{where } I_{IOB}(k) = \frac{1}{12}I_{basal}^{hourly} \text{ if } IOB_{required} \leq IOB.$$

In some examples, there may not be constraints on the AGC algorithm or application that limit the delivery of insulin below basal insulin at any given time-step k, except for a hard coded safety constraint that suspends insulin delivery at glucose below 60 mg/dL regardless of any other factors. Other than the hard-coded suspension below 60 mg/dL, any delivery less than the basal is the result of the minimization of a cost function utilized by the AGC algorithm or application.

Referring to chart 150 of FIG. 1C, at any such point, say at k, $I(k) \leq I_{IOB}(k)$. Likewise, the suggested dose at I(j) may be based upon CGM(j) and IOB(j).

An additional data point at sample (j') in which the threshold (i.e., the granular reading continues to increase) is breached as a $3^{rd}$ consecutive sample of granular reading, the AGC algorithm or application may derive I(j') using similar equations.

At any such interim point t(j'), the threshold may be breached. For example, I(j')<I(k), where CGM(k)>CGM(j').

The suggested insulin dosages to be delivered as micro-boluses at I(j) and I(k) may be based upon discrete sampling. For example, since, I(j')<I(k), at $3^{rd}$ consecutive CGM sample in which the blood glucose trend is rising, the AGC algorithm may cause delivery of a sub-microbolus as (I(k)/5)*3. For example, a microbolus calculated as (I(k)/5)*3 may have an approximate value between 0.1 and 0.425 Units of insulin. While I(k) is considered a more reactive microbolus, I(j') is sooner and avoids reactive bolusing at t(k) due to granular availability of CGM(j') earlier.

In the above equations, the symbol I(k) has the units U and represents insulin delivery at a given time-step k (e.g., units U/5 min). The symbol I'(k) has the units U and represents an insulin deviation, which is the difference between an amount of insulin requested in an insulin dose command from the AGC algorithm and pre-programmed basal rate. The symbol $I_{hi}'(k)$ has units U and represents a positive deviation of insulin delivery above pre-programmed basal rate at time-step k, where U is defined as units of insulin per 5 minutes). The symbol $I_{lo}'(k)$ is in units U and represents a negative deviation of insulin delivery below pre-programmed basal rate at time-step k. In this example, insulin is constrained 青ペン $\geq 0$. The symbol CGM(k) is in units of mg/dL, which is a CGM measurement at time-step k. The symbol $G_p(k)$ is in units of mg/dL and represents a predicted blood glucose at time-step k. The symbol G'(k) is in units of mg/dL and represents a deviation of glucose G from glycemic setpoint $G_{sp}$, e.g., G'(k)=$G_p$(k)–$G_{sp}$(k) for predicted glucose $G_p$. The symbol $I_{IOB}(k)$ is in units U and represents an IOB constraint on the insulin delivery at time-step k. The symbol $I_{AGC}(k+l)$ is in units U and represents a dose of insulin recommended by that algorithm at time (k+l), where l is value less than or greater than a time-step k. The symbol $I_{basal}$ hourly is in units U and represents an insulin basal rate per hour.

The AGC algorithm can also be invoked based upon crossing thresholds. A simple threshold establishment can be done as described with reference to the example process illustrated in FIG. 2.

Figure 2:
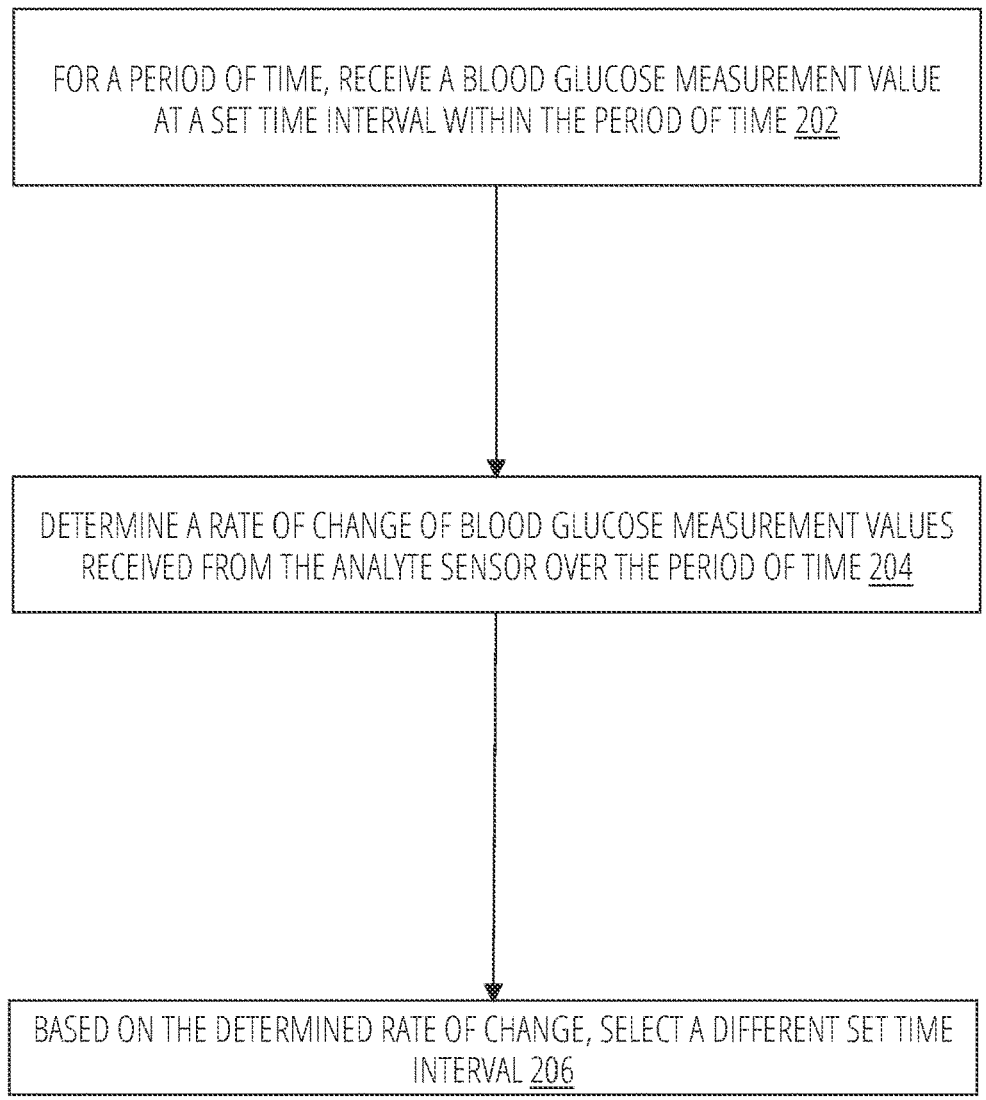
FIG. 2 illustrates a process example in accordance with one embodiment.

FIG. 2 illustrates a process in accordance with one embodiment. The process 200 may be implemented by a processor of a wearable drug delivery device, or by a logic circuitry of CGM (shown in a later example).

In block 202, the processor of the wearable drug delivery device executing process 200 may be operable to receive data, such as a blood glucose measurement value, from an analyte sensor remote from or integrated with the wearable drug delivery device at set time interval and may receive a number of blood glucose measurement values over a period of time. The set time interval may, for example, be selected by the processor and the period of time may span multiple set time intervals, such as 15 minutes, 30 minutes, 60 minutes, 90 minutes, 120 minutes, or the like.

In block 204, the processor determines a rate of change of the blood glucose measurement values received from the analyte sensor over a period of time that may span multiple time intervals. For example, the CGM may output a blood glucose measurement value at time 102. This processor may identify the blood glucose measurement value associated with time 102 as CGM (t=0)), but as time proceeds and the next blood glucose measurement value is received at time 104, the processor may relabel the blood glucose measurement value at time 102 as CGM (t=(−)1) and store the relabeled blood glucose measurement value in a memory. This relabeling and setting of the present blood glucose measurement value as CGM (t=0) and decrementing the labels of the previously-received blood glucose measurement values may proceed as the number of samples increases and present blood glucose measurement values are received by the wearable drug delivery device and stored in a memory.

As the blood glucose measurement values are received and stored, the processor, when determining the rate of change of blood glucose measurement values over the period of time that spans multiple time intervals, may be operable to utilize a sample threshold equation to determine whether a rate of change between the blood glucose measurement values at the different times exceeds a sample threshold value. Alternatively, the processor may be operable to utilize several select samples (e.g., blood glucose measurement values from the past five times (e.g., time=(−)4 to time=0) or the like in the sample threshold equation to determine whether a rate of change between blood glucose measurement values at different times exceeds a sample threshold value.

In an example, the processor of the wearable drug delivery device may be operable compare the blood glucose measurement values from different times (e.g., CGM (t=1) to CGM (t=0)) to determine a rate of change.

The sample threshold can be defined as shown in Equation 3 below:

$$\text{samplethreshold}(t) = c + (\text{CGM}(t=(X-1)) - \text{CGM}(t=(X)))/\text{seconds}$$

where X is a time when a current sample (e.g., time 104) has been taken and X-1 (e.g., time 102) is the time when a previous sample was taken, and error compensation "c" in the threshold(t) calculation of Equation 3 may be used to accommodate for errors in the CGM reading. For example, the error compensation "c" value may be an integer value, a constant value (e.g., 3. 5), a variable, a percentage, such as 0.5%, 1% or the like of the total CGM difference (i.e., CGM(t=(X−1))–CGM (t=x)), or the like.

If the calculated value of the sample threshold at a particular time, such as sample threshold (t), where t=X, exceeds a certain value, the processor may interpret the calculated sample threshold (t) value as indicating a rapid decrease (e.g., 9 or more mg/dL per minute or the like) in the user's blood glucose measurement levels.

In block 206 of process 200, based on the determined rate of change, the processor may be operable to select a different set time interval for receiving blood glucose measurement values.

In one example, the processor may be operable to choose the different set time interval from a table when selecting the different set time interval. For example, the table may be based on the determined rate of change and each different set time interval may be a set time value that, for example, is half, one third, one quarter or one fifth of the set time interval. Of course, other set time intervals may be included in the table of different set time intervals.

In another example, the processor when selecting the different set time interval may be operable to calculate the different set time interval based on the determined rate of change and the set time interval by dividing the set time interval by a constant. In addition, the processor may be further operable to, after selection of the different set time interval, set the different set time interval to the set time interval for future receipt of blood glucose measurement values at the set time interval.

In a further example, an action that the processor may be operable to take is to automatically increase the number of CGM readings. For example, the processor may determine that based on the blood glucose measurement values at samples 102 and 104, or a rate of change thereof, exceeding the sample threshold, the set time interval should be 1, 1.5, 2.0, 2.5, 3.0 minutes or the like. As a result, the processor may start receiving blood glucose measurement values from the CGM at a number of times such as those represented by lines 114 and 116 and, which may include a time that corresponds to sample 106. In the example of FIG. 1A, the negative rate of change of the blood glucose measurement values indicates that the user may be heading toward a hypoglycemic event. By switching to a shorter or more frequent set interval, the time that the processor of the wearable drug delivery device needs to determine when to generate an alarm may be shortened and, as a result, the user may be alerted earlier and not experience the hypoglycemic event or experience reduced symptoms of the hypoglycemic event because of intervention by the processor (executing an automatic glucose control application).

In addition, or alternatively, the processor may select a different set time interval based on the CGM output settings and the wearable drug delivery device receipt settings as well as the determined rate of change. For example, the processor may consider the CGM output settings are already at their highest rate of output of blood glucose measurement values, while the wearable drug delivery device settings are at a more relaxed rate for receiving the blood glucose measurement values from the CGM. As such, in response to a negative rate of change, the processor may determine that the wearable drug delivery device settings (e.g., set time interval) are to be adjusted to increase the frequency at which the wearable drug delivery device is set to receive the more frequent outputs from the CGM. For example, the frequency at which the wearable drug delivery device is set to receive outputs from the CGM may be increased to match or closely match the output frequency of the CGM.

The processor may, after selection of the different set time interval, set the different set time interval as the set time interval for future receipt of blood glucose measurement values at the set time interval.

In another operational example, the CGM may be set to output values at an increased frequency, but the processor of the wearable drug delivery device may be operable to, via selectable settings of the wearable drug delivery device, receive the outputted blood glucose measurement values at the set interval. For example, the wearable drug delivery device may have a user interface used to set up the CGM, or a controller may have a user interface that enables, via a communication session with the CGM an initial set up of the CGM settings and the wearable device or controller settings. During the setup of the CGM, the respective user interface may enable the user (or guardian or health care provider) to select a set time interval when the wearable drug delivery device (or controller) receives the blood glucose measurement values from the CGM. Alternatively, the setting of the output of the blood glucose measurement values from the CGM may be according to a default setting of a set time interval, such as every 5 minutes. Either the user-selected set time interval or the default set time interval may correspond to the set time interval for the AGC application to receive the blood glucose measurement values from the CGM.

In more detail, the CGM, via a communication session established by a communication circuit of the wearable drug delivery device with a communication circuit of the CGM (both shown in a later example), may be operable to receive commands that cause the CGM to increase (or decrease) the frequency of sampling of blood glucose and outputting the blood glucose measurement values obtained from sampling the blood of the user. In addition, after selection of the different set time interval, the processor may replace the set time interval with the selected different set time interval for future receipt of blood glucose measurement values.

The process 200 enables the processor when executing an AGC application to suspend insulin delivery more quickly in the case of a blood glucose downward trend (i.e., a negative rate of change).

In more detail, as shown in FIG. 1A, the processor of the wearable drug delivery device may receive blood glucose measurement values at samples 102, 104, and 106 (that correspond to times at 5 minutes, 10 minutes and 15 minutes, respectively), but may not receive the blood glucose measurement value at sample 108 (which corresponds to the time 20 minutes) because of a communication error, such as a loss of connectivity or inability to establish a communication session between processor and CGM.

In another beneficial embodiment, the more rapid CGM measurements may be selected in cases where rapid rates of change may involve high risk physiological conditions. For instance, if the rate of change in the user's glucose may lead the user to go below a hypoglycemic threshold setting (e.g., 70 or 60 mg/dL) over the next 10 minutes, for example, then the processor may automatically cause receipt of blood glucose measurement values on demand from the CGM more often than an initial set time interval of 5 minutes. For example, if the user's glucose is 300 mg/dL, and the next measurement 5 minutes later is 250 mg/dL, then the rate of change (ROC) is a negative 50 mg/dL per 5 minutes (i.e., (–)50 mg/dL/5 min). The user's blood glucose may drop 100 mg/dL per 5 minutes for the next 10 minutes, potentially causing the user to experience hypoglycemia.

Although the processor may be operable to generate an alarm or an alert at the 10 minute mark, this may not be sufficiently rapid for the user to avoid symptoms of hypoglycemia. In addition, or alternatively, if the AGC application may be operable to recognize this rapid negative rate of change, the AGC application, according to the examples described herein, is operable to trigger a measurement every minute, and be able to alert for low glucose at the 8 minute mark instead, alerting the user 2 minutes earlier than the previous efforts. The processor of the wearable drug delivery device and/or the logic circuitry of the CGM may be operable to follow a rule of when the threshold for rate of change is surpassed, the frequency of sampling and delivery of the blood glucose measurement values is increased.

The processor may be able to use the blood glucose measurement values from samples 102-106 to estimate an expected blood glucose measurement value of the reading that was supposed to be received at sample 108. However, there will be a degree of uncertainty with the expected blood glucose measurement value until the CGM reading for sample 110 is received to update the estimate of the expected blood glucose measurement value for sample 108. The time gap caused by 1 missing CGM reading when the set time interval is 5 minutes is 10 minutes. For some users, a 10 minute time gap when their blood glucose measurement values are trending downward (i.e., have a negative rate of change) may be harmful to them as they may begin experiencing symptoms of a hypoglycemic event. Hence, it is an advantage to have a set time interval that is shorter than 5 minutes, but also an advantage to be able to quickly switch to a shorter set time interval. For example, the processor may be able to switch to a more frequent set time interval (sampling every 1 minute, such as times 112, 114 or 116) upon a determination that a blood glucose measurement value has been missed.

In the case of where the determined rate of change is determined to be a positive rate of change, or in other words, the blood glucose measurement values are trending upward, such as from 115 mg/dL to 130 mg/dL, the processor may take no action with regard to the set time interval. Alternatively, or in addition, the processor may be operable, in response to a determination that the determined rate of change is beginning to trend positive, to select a different set time interval that is less frequent. For example, if the set time interval is 1 minute, the processor, in response to a detected positive rate of change, may select a different set time interval that is within the capability of the CGM, such as 2 minutes, 3.5 minutes, 5 minutes, or other times. The selection of the time as the different set time interval may be based on the duration (how long the rate of change has been positive) or magnitude of the upward trend in the blood glucose measurement values.

In addition, the response of the processor to the sample threshold not being exceeded or the rate of change being low, may be to select a different set time interval that increases the time between receipt of blood glucose measurement values. In the case where the determined rate of change remains low (both in the negative range and positive range), such as approximately zero or within range of a target blood glucose level (e.g., within ±5% of a target blood glucose setting of 115 mg/dL) over a predetermined number of measurements or a time period, the processor may determine to reduce the frequency of receipt of the blood glucose measurement values from the CGM. For example, if the rate of change is low (either positive or negative), the processor may determine that the set time interval may be set back to 5 minutes. Doing so may extend the life of the CGM sensor and/or batteries within the CGM. Alternatively, the selection of different set time intervals may be in stages, for example, if the ROC surpasses Y (e.g., where Y is 10 mg/dL per minute), then switch to 1 minute; if the ROC decreases below Y, then go back to 5 minute sampling.

The wearable drug delivery device may also include a communication circuit that may be operable to establish, in response to a control signal from the processor, a communication session with an analyte sensor, such as the CGM, that may be remote from the wearable drug delivery device. The communication session is established to enable receipt of the blood glucose measurement value at the set time interval. During the communication session, the processor may receive the blood glucose measurement value as well as transmit control signals to the CGM regarding changes to the set time interval and the like. Other technical features may be readily apparent to one skilled in the art from the following figures, descriptions, and claims.

Figure 3:
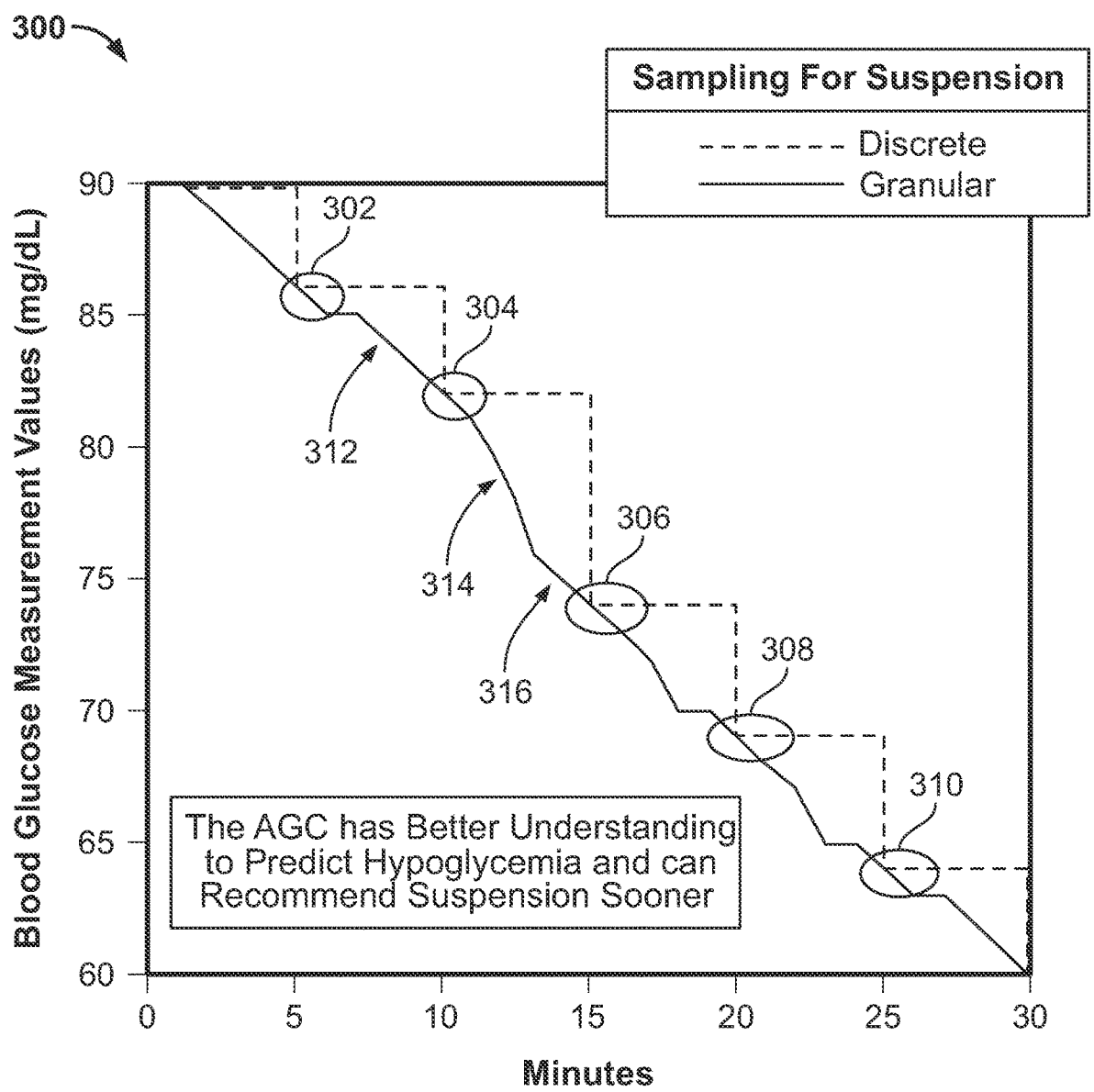
FIG. 3 illustrates yet another graphic of analyte sensor sampling at a first time interval compared to analyte sensor samples taken at a second time interval or substantially continuously.

FIG. 3 illustrates another graphic of analyte sensor sampling at a first time interval compared to analyte sensor samples taken at a second time interval, which may be substantially continuously.

A variable sampling setting for both a wearable drug delivery device and a CGM may be beneficial to enable the processor executing an AGC application to make a more rapid determination to suspend delivery of insulin. The chart 300 has a vertical axis of blood glucose measurement values ranging from 60 mg/dL to 90 mg/dL and a horizontal axis of number of minutes 0 to 30.

In the example shown in FIG. 3, the processor may receive a blood glucose measurement value at the set time interval of every 5 minutes. For example, sample 302 corresponds to time 5 minutes with a blood glucose measurement value of approximately 86 mg/dL, sample 304 corresponds to time 10 minutes with a blood glucose measurement value of approximately 83 mg/dL, sample 306 corresponds to time 15 minutes with a blood glucose measurement value of approximately 74 mg/dL, sample 308 corresponds to time 20 minutes with a blood glucose measurement value of approximately 68 mg/dL, and sample 310 corresponds to time 25 minutes with a blood glucose measurement value of approximately 63 mg/dL. The samples 302-310 are shown on a stairstep (dashed) line. This time interval of 5 minutes has been shown to consume power efficiently and allows for an appropriate reserve power, such as 10-20% for contingency operations (e.g., additional processing time, communications, alerts or notifications, or the like). Chart 300 illustrates how sampling at the first interval, e.g., 5 minutes, reveals blood glucose measurement values of samples 302, 304, 306, 308 and 310 that illustrate a negative rate of change that may lead to a user's blood glucose falling below a hypoglycemic threshold, such as 60 mg/dL or 70 mg/dL.

Alternatively, or in addition, the analyte sensor or CGM may be operable to obtain blood glucose measurement values at smaller time intervals and provide them to a wearable drug delivery device or controller. The smaller time intervals and samples may be indicated by lines 312, 314 and 316, which represent a number of samples closer in time than the discrete samples 302-310. Of course, the smaller time intervals may be approximately any period of time (e.g., 30 seconds, 1 minute, 2.5 minutes, 3 minutes or the like) along the continuous line (that includes lines 312, 314, and 316).

Moreover, the processor implementing the AGC application may gain better insight into the user's changing blood glucose measurement values, such as decreasing values that indicate a potential hypoglycemia event or increasing values that indicate a potential hyperglycemia event. In the case of the user's blood glucose measurement values trending downward, the processor may be able to more quickly determine that further delivery of insulin should be suspended and take the appropriate action, such as generating control signals to suspend insulin delivery, issuing an alarm, issuing a recommendation to the user to consume carbohydrates, and the like. It may be helpful to describe a process example with reference to FIG. 3 and FIG. 4 below.

Figure 4:
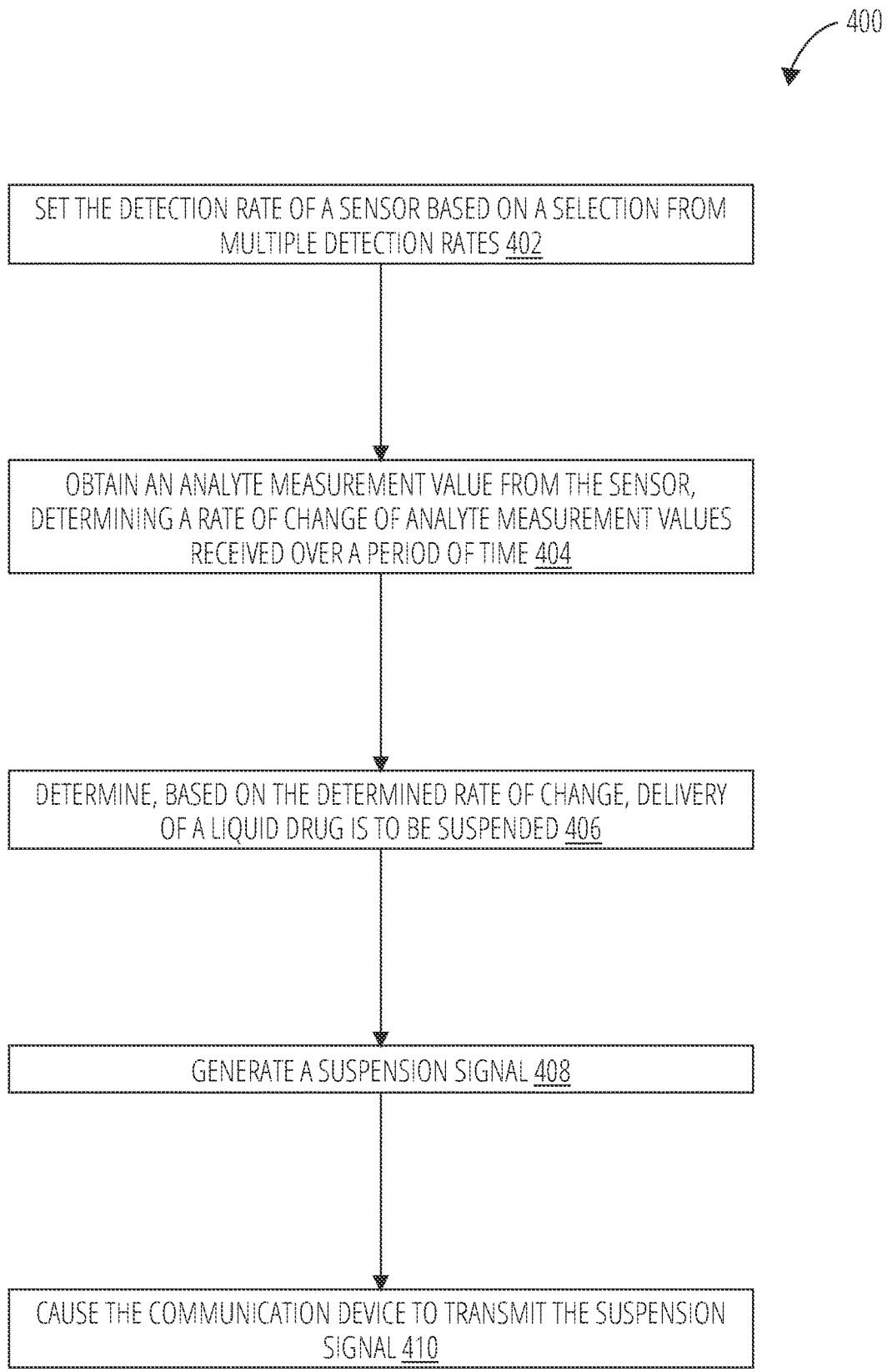
FIG. 4 illustrates another process example in accordance with another embodiment.

FIG. 4 illustrates a flowchart of an example process according to an embodiment of the disclosed subject matter. The process 400 of FIG. 4 may be implemented by a processor or logic circuitry of an analyte sensor. An example of an analyte sensor may be a continuous glucose monitor that is operable to detect blood glucose and output a blood glucose measurement value. The analyte sensor may include logic circuitry, a sensor and a communication circuit. In the example, the logic circuitry may be disposed in an analyte sensor, such as a CGM, as well as a communication device. The logic circuitry disposed on the CGM may control the communication device and be operable to implement the process 400 and communicate with the wearable drug delivery device to cause the wearable drug delivery device to suspend or increase delivery of insulin.

The described system and processes may also be useful in the detection and mitigation of a condition known as diabetic ketoacidosis, which is a condition caused by elevated ketones in the blood of a user. Diabetic ketoacidosis is a condition in which glucose is unavailable to the body for energy and the body begins to burn fat for energy. Ketones are chemicals that the body creates when it breaks down fat for energy. By monitoring trends in a user's ketone values (i.e., ketone value trend) according to the processes described herein, onset of ketoacidosis may be avoided. Another example of an analyte sensor (described with reference to later example) may be a ketone sensor. Note that ketones may also be detected using a breath sensor (which is not shown but may be incorporated in a controller shown in a later example) or urine content sensor; however, a subcutaneous ketone sensor gives more accurate information and is more continuous.

In block 402, the logic circuitry may be operable to implement the process 400 and set the detection rate of the sensor based on a selection from multiple detection rates. The logic circuitry may be operable to execute programming code stored in a memory that includes a lookup table with multiple detection rates and criteria that informs the logic circuitry of which respective detection rate to select from the multiple detection rates.

In block 404, the logic circuitry implementing process 400 obtains one or more analyte measurement values from the sensor and determines a rate of change of analyte measurement values received over a period of time. In an example, the analyte sensor may include a memory coupled to the logic circuitry. In the example, the logic circuitry may be operable to retrieve past analyte measurement values in a memory coupled to the logic circuitry, analyze the analyte measurement value with reference to the past analyte measurement values stored in the memory, determine an updated rate of change of the analyte measurement value and the past analyte measurement values.

In block 406, process 400 determines, based on the determined rate of change, delivery of a liquid drug is to be suspended. In the example of an updated rate of change, the logic circuitry may be further operable to determine whether the updated rate of change exceeds a sample threshold. The sample threshold may be determined according to Equation 3 above or may include multiple analyte measurement values. In response to the updated rate of change exceeding the sample threshold, the logic circuitry may cause the generation of the suspension signal at block 408.

In block 408, the logic circuitry generates a suspension signal. For example, the logic circuitry may generate the suspension signal that may include a duration of the suspension or indicate a treatment protocol for ending the suspension and gradually readministering insulin doses (e.g., end suspension, administer X units or mL of insulin every hour for next two hours, or the like).

In block 410, the logic circuitry may cause the communication circuit to transmit the suspension signal. For example, the logic circuitry may send a control signal to the communication circuit which establishes a communication session with a communication device of the wearable drug delivery device to receive the suspension signal.

In addition, the logic circuitry, when determining the rate of change may be further operable to determine a negative rate of change of the analyte measurement values, and in response to the determined negative rate of change, increase the detection rate of the sensor. The logic circuitry may be further operable to, in response to the increased detection rate of the sensor, cause the communication circuit to output a result of a detection of the analyte measurement value from the blood sample of the user to an external device. The output of the result of the detection may be at a rate matching the increased detection rate of the sensor.

Conversely, the logic circuitry may be further operable to determine a positive rate of change of the analyte measurement values, and in response to the determined negative rate of change, decrease the detection rate of the sensor. The logic circuitry is further operable to, in response to the decreased detection rate of the sensor, cause the communication circuit to output a result of a detection of the analyte measurement value from the blood sample of the user to an external device. The output of the result may be at a rate matching the decreased detection rate of the sensor.

In another example, the logic circuitry may be further operable to provide, based on the set detection rate, the analyte measurement value to the communication circuit for transmission by the communication circuit.

Other technical features may be readily apparent to one skilled in the art from the following figures, descriptions, and claims.

Figure 5:
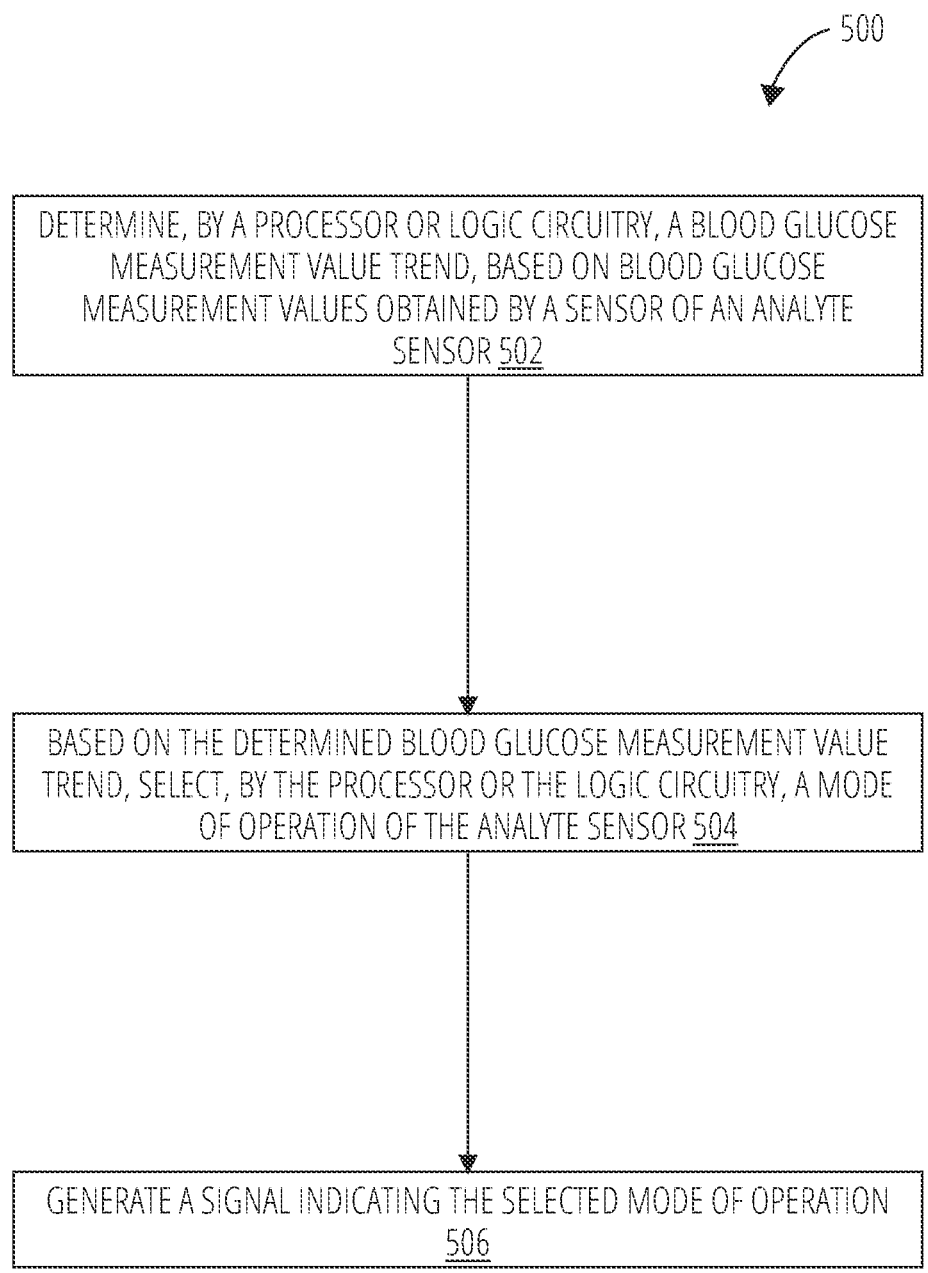
FIG. 5 illustrates an example of a process according to an aspect of the disclosed subject matter.

FIG. 5 illustrates an example of a process according to an aspect of the disclosed subject matter. In the process 500, a processor or logic circuitry is operable to respond to events other than or in addition to a change in the rate of change or blood glucose measurement value trend. In the example process 500, the AGC application may be executed by a processor of a wearable drug delivery device or logic circuitry of an analyte sensor. For example, the logic circuitry of the CGM may be operable to respond to rapid blood glucose measurement value changes by communicating alarms and insulin requests to the wearable drug delivery device. It is envisioned that the CGM may have different modes of operation.

In block 502, the processor or the logic circuitry implementing process 500 may be operable to determine that an event affecting a blood glucose measurement value trend of a user has occurred. An event may be ingestion of a meal, participation in exercise, a bolus dosage, sleeping, waking, or the like. The events may be self-reported by a user. For example, the user may request a meal bolus, which is an indication of consumption, or imminent consumption, of a meal. Or, the user may input event information, such as they are about to participate in a 5 kilometer run or other exercise. Alternatively, or in addition, the AGC application may be operable to automatically respond to an event. For example, the AGC application may be operable to implement other features or receive information from other applications via a plug-in or an application programming interface. Examples of the other applications or features may be a fitness application, global positioning applications, meal planning applications, carbohydrate estimating or calorie counting applications, a calendar application, exercise detection or exercise determination applications, and the like. Events indicated by the other applications may be breakfast, lunch or dinner appointments, exercise events (such as a scheduled fitness class and its location), an exercise determination, a location of a restaurant or eatery, or the like. The respective applications, that are operable to provide indications of occurrences of events that may trigger the AGC application to modify a set time interval (or sampling rate) for the CGM to provide readings.

In block 504, the processor or logic circuitry, based on the occurrence of the event (also referred to as "the determined event"), may be operable to select a mode of operation of the analyte sensor. The CGM may have multiple modes of operation that may be set by an external device via a control signal or by logic circuitry operating in the CGM.

For example with reference to FIG. 1A, in a first mode, the CGM may be operable to collect a sample from a user nearly continuously and have sufficient power to output the results of processing the sample, every few seconds or at intervals smaller than the 5 minute intervals shown by times 102-110 of FIG. 1A, to a wearable drug delivery device. In another mode, the CGM may collect samples at times that correspond to a set interval, such as the 5 minute intervals of the times 102-110 of FIG. 1A. The interval may be set at an initial setting (e.g., during a setup procedure), or may be a default setting, and may continue at that setting unchanged until the CGM needs to be replaced. In yet another mode, the CGM may include logic circuitry that is operable to allow the interval to be set at an initial setting, but is also operable to receive a signal from an external device that the logic circuitry interprets as a command signal to alter the interval to, for example, output blood glucose measurement values, such as 112, 114 and 116. Other modes may also be provided, such as a staggered mode of operation in response to negative rate of change or meal bolus (e.g., change to 4 minute reporting, then 2 minute reporting, and then 1 minute reporting) or in response to a positive rate of change or participation in exercise (e.g., change from 1 minute reporting to 3 minute reporting, to 4 minute reporting, then 5 minute reporting). For ease of discussion, all of the other modes are not discussed in detail.

In the case of a recent meal event or a large meal bolus, the AGC application may be operable to request on-demand CGM readings to ensure if more adjustments to basal is needed to compensate for the rising blood glucose. An on-demand CGM reading may be whenever the AGC application requests a reading (i.e., a blood glucose measurement value). For example, when the AGC application determines that the user's blood glucose is within the target range for a predetermined amount of time, such as 20 minutes or the like, the AGC application may request that the CGM provide a reading every 5 minutes. Conversely, if the AGC application determines that a negative rate of change is occurring, the AGC application may request a reading every 2 minutes depending upon the degree of the negative rate of change. For example, a steeper negative rate of change may cause the AGC application to request more frequent reading reports, such as every 1 minute or the like. An event may also be a time of day as it may be beneficial to sample more frequently during particular times of day, such as during mealtimes, and less frequently during sleep times. Such tailored sampling by the processor or the logic circuitry may preserve the power supply (e.g., battery life) and/or sensor life of the CGM.

In block 506, the processor of the wearable drug delivery device or the logic circuitry of the CGM may be operable to generate a signal indicating the selected mode of operation.

In an example of the processor of the wearable drug delivery device executing process 500, the processor may cause a communication device to establish a communication session, if one is not already established, with the CGM and the logic circuitry. The processor may output a control signal that indicates the selected mode of operation based on the determined event. In an example, a communication device of the wearable drug delivery device may transmit the control signal via the established communication session to the logic circuitry of the CGM. The logic circuitry of the CGM may respond to the control signal by changing the mode of operation to the selected mode indicated by the control signal.

Alternatively, the logic circuitry may be executing process 500, the logic circuitry may cause a communication device to establish a communication session, if one is not already established, with the wearable drug delivery device A process of the logic circuitry may output a signal that indicates the selected mode of operation, and another process of the logic circuitry may respond based on the determined event. In an example, a communication device of the wearable drug delivery device may transmit the control signal via the established communication session to the logic circuitry of the CGM. The logic circuitry may respond to the control signal by changing the mode of operation to the selected mode indicated by the control signal.

Figure 6:
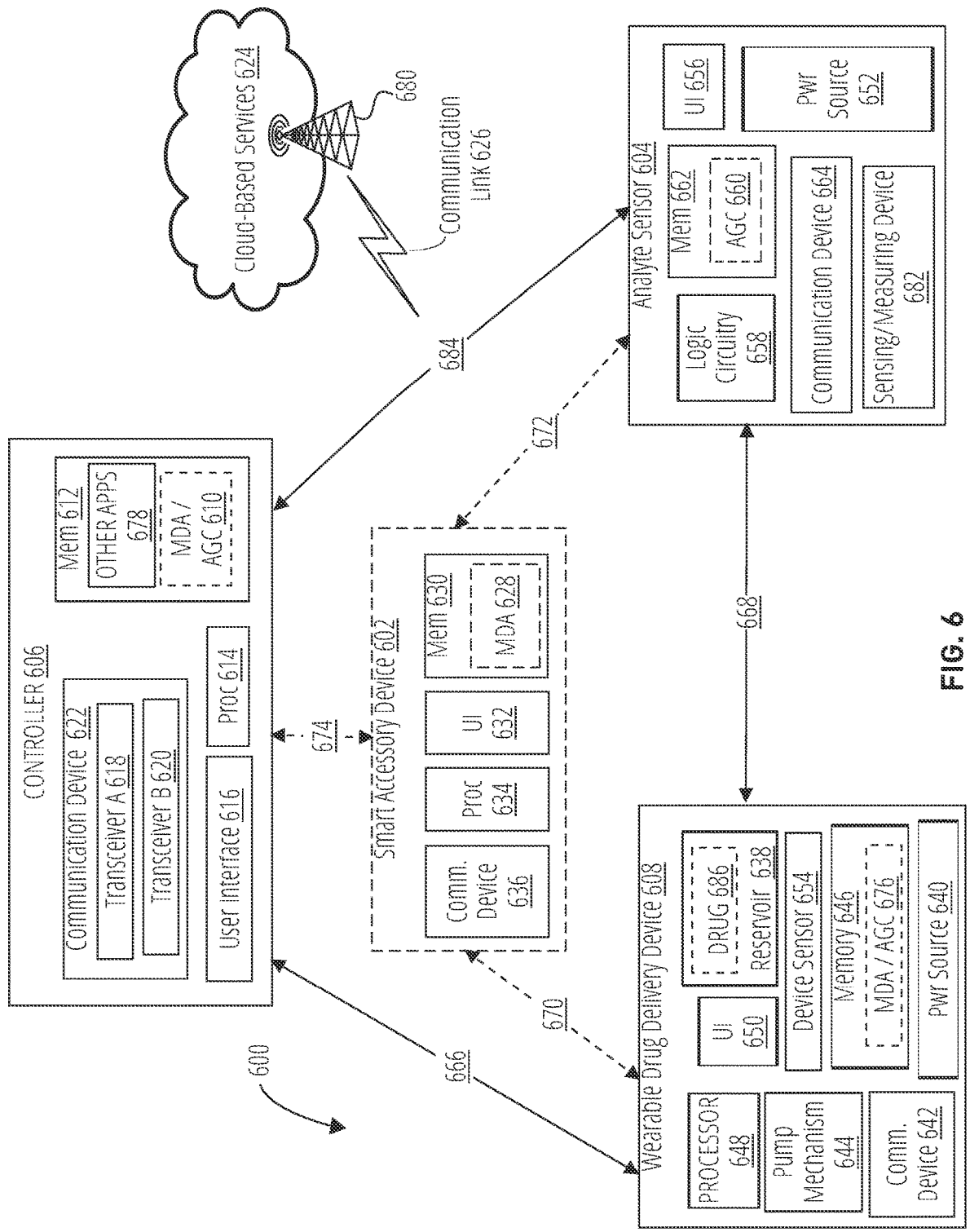
FIG. 6 illustrates a functional block diagram of a system example suitable for implementing the example processes and techniques described herein.

FIG. 6 illustrates a functional block diagram of a system example suitable for implementing the example processes and techniques described herein.

The automatic wearable drug delivery system 600 may implement (and/or provide functionality for) a medication delivery algorithm (MDA), such as an artificial pancreas (AP) application or an automatic glucose control (AGC) application, to govern or control automated delivery of a drug, a therapeutic, or a medication, such as insulin, to a user (e.g., to maintain euglycemia—a normal level of glucose in the blood). The automatic wearable drug delivery system 600 may, for example, include an analyte sensor 604, a controller 606, a wearable drug delivery device 608, and an optional smart accessory device 602.

The controller 606 may be remote from the wearable drug delivery device 608 and may include a user interface 616, a communication device 622, a memory 612, and a processor 614. The user interface 616 is coupled to the processor 614 and operable to receive inputs related to a physiological condition of a user and provide the input to the processor 614. In an example, the input may be a request for a bolus dosage. The controller 606 may include a user interface 616, which may be a keypad, a touchscreen display, levers, light-emitting diodes, buttons on the controller 606, a microphone, a camera, a speaker, a display, or the like, that is configured to allow a user to enter information and allow the controller 606 to output information for presentation to the user (e.g., alarm signals, exercise recommendations (e.g., exercise times and/or exercise intensity, and the like). The user interface 616 may provide inputs, such as a voice input, a gesture (e.g., hand or facial) input to a camera, swipes to a touchscreen, or the like, to processor 614 which the programming code interprets.

The controller 606 may be a computing device such as a smart phone, a tablet, a personal diabetes controller, a dedicated diabetes therapy controller, or the like. In an example, the controller 606 may include a processor 614, a controller memory 612, a user interface 616, and a communication device 622. The controller 606 may contain analog and/or digital circuitry that may be implemented as a processor 614 for executing processes based on programming code stored in the controller memory 612, such as the medication delivery algorithm or application or an automatic glucose control application (MDA/AGC) 610 and related programming code as well as sampling threshold values. The processor 648 may be used to program, adjust settings, and/or control operation of the wearable drug delivery device 608 and/or the analyte sensor 604 as well as the optional smart accessory device 602.

The one or more transceivers, transceiver A 618 and transceiver B 620 may operate according to one or more radio-frequency protocols. In the example, the transceivers 618 and 620 may be a cellular transceiver and a Bluetooth® transceiver, respectively. For example, the transceiver A 618 or transceiver B 620 may be configured to receive and transmit signals containing information usable by the MDA/AGC 610.

The wearable drug delivery device 608 may include processor 648, a reservoir 638, a communication device 642, a power source 640, a memory 646, device sensor 654, user interface (UI) 650, and a pump mechanism 644. The processor 648 may be operable to control the drug delivery device. The reservoir 638 may be configured to contain a liquid drug. The communication device 642 may be coupled to the processor 648. The pump mechanism 644 may be responsive to the processor 648 and fluidically coupled to the reservoir 638.

The memory 646 may store programming code executable by the processor 648. The programming code, for example, may enable the processor 614 to control expelling insulin from the reservoir 638 in response to control signals from the controller 606 and MDA/AGC 610 or based on signals from the optional MDA/AGC 676.

In the example, the communication device 642, which may be a receiver, a transmitter, or a transceiver or other circuitry that operates according to one or more radio-frequency protocols, such as Bluetooth, Wi-Fi, a near-field communication standard, a cellular standard, or the like. The communication device 642 may enable the processor 648 to communicate with the controller 606 and the analyte sensor 604.

The wearable drug delivery device 608 may be attached to the body of a user, such as a patient or diabetic, at an attachment location and may deliver any therapeutic substance to a user at or around the attachment location. For example, a bottom surface of the wearable drug delivery device 608 may include an adhesive to facilitate attachment to the skin of a user as described in earlier examples.

The reservoir 638 may store liquid drugs, medications or therapeutic agents suitable for automated delivery, such as diabetes treatment drugs (e.g., insulin, glucagon, glucagon-like peptides), pain relief drugs (e.g., morphine), hormones, blood pressure medicines, chemotherapy drugs, or the like, such 686. The wearable drug delivery device 608 may include a needle or cannula (not shown) coupled to the reservoir 638 and extending into the body of the user for delivering a liquid drug into the user's body of the user (which may be done subcutaneously, intraperitoneally, or intravenously), and a pump mechanism 644 under control of the processor 648 that is operable to transfer the liquid drug from the reservoir 638 through the needle or cannula and into the user.

The power source 640, such as a battery, a piezoelectric device, other forms of energy harvesting devices, or the like, for supplying electrical power to the pump mechanism 644 and/or other components (such as the processor 648, memory 646, and the communication device 642) of the wearable drug delivery device 608.

In some examples, the wearable drug delivery device 608 may include a user interface 650, which may be a keypad, a touchscreen display, levers, light-emitting diodes, buttons on a top portion or side portion of the drug delivery device 608, a microphone, a camera, a speaker, a display, or the like, that is configured to allow a user to enter information and allow the drug delivery device 608 to output information for presentation to the user (e.g., alarm signals or the like). The user interface 650 may provide inputs, such as a voice input, a gesture (e.g., hand or facial) input to an optical sensor, swipes to a touchscreen, or the like, to processor 648 which the programming code interprets.

The wearable drug delivery device 608 may also include a device sensor 654 that may include an accelerometer, a gyroscope, a skin conductance measuring device (e.g., to measure perspiration due to exercise), or the like. The device sensor 654 may be coupled to and provide inputs to the processor 648.

The smart accessory device 602 may be a smart watch, another wearable smart device, including eyeglasses, provided by other manufacturers, a global positioning system-enabled wearable device, a wearable fitness device, smart clothing, or the like, and may be operable to communicate with the other components of system 600 via wireless communication links 670, 672, or 674.

For example, the smart accessory device 602 may include a communication device 636, a processor 634, a user interface 632 and a memory 630. The user interface 632 may be a graphical user interface presented on a touchscreen display of the smart accessory device 602. The memory 630 may store programming code to operate different functions of the smart accessory device 602 as well as an instance of the MDA 628. The processor 634 that may execute programming code, such as MDA 628 for controlling the wearable drug delivery device 608 to implement the processes and techniques of FIGS. 1-4 described herein.

The analyte sensor 604 may include logic circuitry 658, a memory 662, a sensing/measuring device 682, a user interface 656, a power source 652, and a communication device 664. The analyte sensor 604 may be configured to detect multiple different analytes, such as lactate, ketones, uric acid, sodium, potassium, alcohol levels, blood glucose, proteins, hormones, or the like, and output results of the detections, such as measurement values or the like, for receipt by one or more of 602, 606 or 608. The analyte sensor 604 may be operable to receive information from a breath sensor or a urine sensor.

The logic circuitry 658 of the analyte sensor 604 may be operable to perform many functions. For example, the programming code stored in the memory 662 may enable the logic circuitry 658 to manage the collection and analysis of data detected by the sensing and measuring device 682, such as blood glucose measurement values, providing trend information and the like. The memory 630 may be configured to store information and programming code, such as an instance of the AGC 660. The logic circuitry 658 may include discrete, specialized logic and/or components, an application-specific integrated circuit, a microcontroller or processor that executes software instructions, firmware, programming instructions, such as the AGC 660, stored in the memory 662), or any combination thereof. The logic circuitry 658 may be operable to implement and provide the functions described with reference to the examples of FIGS. 2, 4 and 5.

In an example, the analyte sensor 604 may be a blood glucose monitor removably attachable via adhesive, for example, to a body of the user. In such an example, the analyte sensor 604 is operable to measure a blood glucose measurement value of the user (not shown) and communicate with the controller 606 and the drug delivery device 608 via the communication device 664 under the control of the logic circuitry 658. The logic circuitry 658 may be operable to execute the AGC 660 that enables implementation of the processes 200, 400 and 500 described above.

The analyte sensor 604 may, in an example, be operable provide blood glucose measurement values at selected set time intervals, such as 5 minutes, 4 minutes, 3 minutes, 2 minutes, 1.5 minutes, 1 minute, 30 seconds or near continuously, depending upon the selected setting. For example, at an initial setting of the AGC 660, the logic circuitry 658 of analyte sensor 604 may be operable to sample a user's blood glucose at a predetermined time interval, such as every 5 minutes, or the like, and output a blood glucose measurement value. The initial setting of the set time interval for the sensing/measuring device 682 to take samples and make measurements may be made via the user interface 656 or in response to control signals from the controller 606 or the wearable drug delivery device 608. In an example, a graphical user interface may be presented that enables selection of set time interval (e.g., 1 minute) from a number of set time intervals, such as those listed above.

The logic circuitry 658 upon execution of the AGC 660 to provide the functions describe with reference to FIGS. 1-5 above may be operable to for a period of time, receive a blood glucose measurement value from the analyte sensor 604 via communication link 668 at a set time interval within the period of time. The period of time may be, for example, 30 minutes, 90 minutes, 120 minutes, 24 hours, 36 hours or 96 hours. The logic circuitry 658 may be further operable to determine a rate of change of the blood glucose measurement values received from the analyte sensor over the period of time. Based on the determined rate of change, the logic circuitry 658 may be operable to select a different set time interval stored in memory 662. For example, a look up table containing a list of different set time intervals may be maintained in memory 662. The processor 648 of the wearable drug delivery device 608 may also perform the described functions with the memory 646 also maintaining a look up table containing a list of different set time intervals.

The communication device 664 of analyte sensor 604 may have circuitry that operates as a transceiver for communicating the blood glucose measurement values to the controller 606 over the wireless link 684 or with the wearable drug delivery device 608 over the wireless communication link 668.

Services provided by cloud-based services 624 may include data storage that stores anonymized data, such as blood glucose measurement values, data related to set time intervals for analyte sensors produced by different manufacturers, and other forms of data. The cloud-based services 624 may be accessed via data network device 680, which may be a Wi-Fi device, a cellular communication tower, a local area network, a campus wide network or the like.

The wireless communication links 666, 668, 670, 672 and 684 may be any type of wireless link operating using known wireless communication standards or proprietary standards. As an example, the wireless communication links 666, 668, 670, 672 and 684 may provide communication links based on Bluetooth®, Zigbee®, Wi-Fi, a near-field communication standard, a cellular standard, or any other wireless protocol.

Software related implementations of the techniques described herein, such as the processes examples described with reference to FIG. 2, FIG. 4 and FIG. 5 may include, but are not limited to, firmware, application specific software, or any other type of computer readable instructions that may be executed by one or more processors or logic circuitry. While the processes 200, 400 and 500 were primarily discussed as being implemented on a wearable drug delivery device 608 or an analyte sensor 604, a processor of controller 606 may also be operable to provide the above functions and take the described actions. The computer readable instructions may be provided via non-transitory computer-readable media. Hardware related implementations of the techniques described herein may include, but are not limited to, integrated circuits (Ics), application specific Ics (ASICs), field programmable arrays (FPGAs), and/or programmable logic devices (PLDs). In some examples, the techniques described herein, and/or any system or constituent component described herein may be implemented with a processor executing computer readable instructions stored on one or more memory components.

In addition, or alternatively, while the examples may have been described with reference to a closed loop algorithmic implementation, variations of the disclosed examples may be implemented to enable open loop use. The open loop implementations allow for use of different modalities of delivery of insulin such as smart pen, syringe or the like. For example, the disclosed MDA/AGC application and algorithms may be operable to perform various functions related to open loop operations, such as the generation of prompts requesting the input of information such as weight or age. Similarly, a dosage amount of insulin may be received by the MDA/AGC application or algorithm from a user via a user interface. Other open-loop actions may also be implemented by adjusting user settings or the like in an MDA/AGC application or algorithm.

Some examples of the disclosed device or processes may be implemented, for example, using a storage medium, a computer-readable medium, or an article of manufacture which may store an instruction or a set of instructions that, if executed by a machine (i.e., processor, logic circuitry, or controller), may cause the machine to perform a method and/or operation in accordance with examples of the disclosure. Such a machine may include, for example, any suitable processing platform, computing platform, computing device, processing device, computing system, processing system, computer, processor, logic circuitry, or the like, and may be implemented using any suitable combination of hardware and/or software. The computer-readable medium or article may include, for example, any suitable type of memory unit, memory, memory article, memory medium, storage device, storage article, storage medium and/or storage unit, for example, memory (including non-transitory memory), removable or non-removable media, erasable or non-erasable media, writeable or re-writeable media, digital or analog media, hard disk, floppy disk, Compact Disk Read Only Memory (CD-ROM), magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, programming code, and the like, implemented using any suitable high-level, low-level, object-oriented, visual, compiled and/or interpreted programming language. The non-transitory computer readable medium embodied programming code may cause a processor, or logic circuitry, when executing the programming code to perform functions, such as those described herein.

Certain examples of the present disclosure were described above. It is, however, expressly noted that the present disclosure is not limited to those examples, but rather the intention is that additions and modifications to what was expressly described herein are also included within the scope of the disclosed examples. Moreover, it is to be understood that the features of the various examples described herein were not mutually exclusive and may exist in various combinations and permutations, even if such combinations or permutations were not made express herein, without departing from the spirit and scope of the disclosed examples. In fact, variations, modifications, and other implementations of what was described herein will occur to those of ordinary skill in the art without departing from the spirit and the scope of the disclosed examples. As such, the disclosed examples are not to be defined only by the preceding illustrative description.

Program aspects of the technology may be thought of as "products" or "articles of manufacture" typically in the form of executable code and/or associated data that is carried on or embodied in a type of non-transitory, machine readable medium. Storage type media include any or all of the tangible memory of the computers, logic circuitry, processors or the like, or associated modules thereof, such as various semiconductor memories, tape drives, disk drives and the like, which may provide non-transitory storage at any time for the software programming. It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single example for streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

The foregoing description of examples has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A wearable drug delivery device, comprising:
   a processor;
   a memory storing an automatic glucose control application, programming code, and data related to the automatic glucose control application;
   a reservoir shaped to contain a liquid drug;
   a pump mechanism controlled by the processor and operable to deliver the liquid drug; and
   a communication circuit controlled by the processor and operable to communicate with an external device, wherein:
      the processor when executing the automatic glucose control application is operable to:
         for a period of time, receive blood glucose measurement values at a first set time interval within the period of time;
         determine a rate of change of the blood glucose measurement values received from an analyte sensor over the period of time; and
         based on the determined rate of change, select a second set time interval different than the first set time interval.

2. The wearable drug delivery device of claim 1, wherein the processor, when determining the rate of change of blood glucose measurement values over the period of time, is further operable to:
   utilize a sample threshold equation to determine whether a rate of change between blood glucose measurement values at different times exceeds a sample threshold value.

3. The wearable drug delivery device of claim 1, wherein the processor, when determining the rate of change of blood glucose measurement values over the period of time, is further operable to:
   utilize several samples in a sample threshold equation to determine whether a rate of change between blood glucose measurement values at different times exceeds a sample threshold value.

4. The wearable drug delivery device of claim 1, wherein the processor receives the blood glucose measurement value from an analyte sensor remote from the wearable drug delivery device at the set time interval.

5. The wearable drug delivery device of claim 1, wherein the processor when selecting the different set time interval is operable to:
   choose the different set time interval from a table, wherein the table is based on the determined rate of change, wherein the different set time interval is a set time value that is half, one third, one quarter or one fifth of the set time interval.

6. The wearable drug delivery device of claim 1, wherein the processor when selecting the different set time interval is operable to:
   calculate the different set time interval based on the determined rate of change and the set time interval by dividing the set time interval by a constant.

7. The wearable drug delivery device of claim 1, wherein the processor is further operable to:
   after selection of the different set time interval, setting the different set time interval to the set time interval for future receipt of blood glucose measurement values at the set time interval.

8. The wearable drug delivery device of claim 1, wherein the communication circuit is further operable to:
   establish, in response to a control signal from the processor, a communication session with an analyte sensor remote from the wearable drug delivery device; and
   receive the blood glucose measurement value during the communication session, wherein the communication session is established to enable receipt of the blood glucose measurement value at the set time interval.

9. The wearable drug delivery device of claim 1, wherein the period of time spans multiple set time intervals.

10. The wearable drug delivery device of claim 1, wherein the processor when selecting the different set time interval is operable to:
    calculate the different set time interval based on the determined rate of change and the set time interval by dividing the set time interval by a constant.

11. An analyte sensor, comprising:
    logic circuitry;
    a sensor coupled to the logic circuitry and operable to determine an analyte measurement value from a blood sample of a user, wherein the sensor is further operable to make the determination of the analyte measurement value at a set detection rate of the sensor; and
    a communication circuit coupled to the logic circuitry and operable to transmit a signal containing the determined analyte measurement value, wherein the logic circuitry is operable to:
       control the sensor including setting the detection rate of the sensor based on a selection from multiple detection rates,
       obtain the analyte measurement value from the sensor, determine a rate of change of analyte measurement values received over a period of time;

based on the determined rate of change, determine that delivery of a liquid drug is to be suspended;

generate a suspension signal; and cause the communication circuit to transmit the suspension signal.

12. The analyte sensor of claim 11, wherein the logic circuitry is further operable to:

provide, based on the set detection rate, the analyte measurement value to the communication circuit to be transmitted by the communication circuit.

13. The analyte sensor of claim 11, wherein the logic circuitry, when determining the rate of change is further operable to:

retrieve past analyte measurement values in a memory coupled to the logic circuitry;

analyze the analyte measurement value with reference to the past analyte measurement values stored in the memory;

determine an updated rate of change of the analyte measurement value and the past analyte measurement values;

determine that the updated rate of change the analyte measurement value and the past analyte measurement values exceeds a sample threshold; and in response to the updated rate of change the analyte measurement value and the past analyte measurement values exceeding the sample threshold, cause the generation of the suspension signal.

14. The analyte sensor of claim 11, wherein the logic circuitry is further operable to:

determine a negative rate of change of the analyte measurement values; and in response to the determined negative rate of change, increase the detection rate of the sensor.

15. The analyte sensor of claim 14, wherein the logic circuitry is further operable to:

in response to the increased detection rate of the sensor, cause the communication circuit to output analyte measurement values at a rate matching the increased detection rate of the sensor a result of a detection of the analyte measurement value from the blood sample of the user to an external device.

16. The analyte sensor of claim 11, wherein the logic circuitry is further operable to:

determine a positive rate of change of the analyte measurement values; and in response to the determined negative rate of change, decrease the detection rate of the sensor.

17. The analyte sensor of claim 16, wherein the logic circuitry is further operable to:

in response to the decreased detection rate of the sensor, cause the communication circuit to output at a rate matching the decreased detection rate of the sensor a result of a detection of the analyte measurement value from the blood sample of the user to an external device.

18. A wearable medical device, comprising:

a processor or logic circuitry; and a memory storing instructions that, when executed by the processor or logic circuitry, configure the wearable medical device to:

determine that an event affecting a blood glucose measurement value trend of a user has occurred;

based on the occurrence of the event, select a mode of operation of an analyte sensor; and generate a signal indicating the selected mode of operation of the analyte sensor.

19. The wearable medical device of claim 18, further comprising:

a communication device coupled to the processor, wherein the processor is further operable to:

output the generated signal indicating the selected mode of operation to a continuous glucose monitor that is communicatively coupled to the processor.

20. The wearable medical device of claim 18, wherein the processor, when selecting the mode of operation of the analyte sensor based on the occurrence of the event is further operable to:

request an on-demand reading by the analyte sensor when the event is determined to be a meal event or a large meal bolus event.

* * * * *